US012786124B2

(12) United States Patent
Kunc et al.

(10) Patent No.: US 12,786,124 B2
(45) Date of Patent: Nov. 3, 2026

(54) SMART NETWORK ROUTING SYSTEM

(71) Applicant: MIMYR, LLC, Torrance, CA (US)

(72) Inventors: Robert Kunc, Rancho Palos Verdes, CA (US); David Wang, Rancho Palos Verdes, CA (US); Michael Mavraganis, Rancho Palos Verdes, CA (US)

(73) Assignee: Mimyr, LLC, Torrance, CA (US)

( * ) Notice: Subject to any disclaimer, the term of this patent is extended or adjusted under 35 U.S.C. 154(b) by 274 days.

(21) Appl. No.: 18/790,115

(22) Filed: Jul. 31, 2024

(65) Prior Publication Data

US 2025/0106156 A1 Mar. 27, 2025

Related U.S. Application Data

(60) Provisional application No. 63/585,769, filed on Sep. 27, 2023, provisional application No. 63/585,772, filed on Sep. 27, 2023.

(51) Int. Cl.

| | |
|---|---|
| ***H04L 45/76*** | (2022.01) |
| ***H04L 45/74*** | (2022.01) |
| ***H04W 40/02*** | (2009.01) |
| *H04W 84/06* | (2009.01) |

(52) U.S. Cl.

CPC .............. *H04L 45/76* (2022.05); *H04L 45/74* (2013.01); *H04W 40/02* (2013.01); *H04W 84/06* (2013.01)

(58) Field of Classification Search

CPC ......... H04L 45/76; H04L 45/74; H04L 45/64; H04W 40/02; H04W 84/06

See application file for complete search history.

(56) References Cited

U.S. PATENT DOCUMENTS

| | | | | |
|---|---|---|---|---|
| 9,277,443 | B2 * | 3/2016 | Backholm | H04W 28/0273 |
| 9,749,214 | B2 | 8/2017 | Han | |
| 9,843,624 | B1 | 12/2017 | Taaghol et al. | |
| 10,320,691 | B1 * | 6/2019 | Matthews | H04L 45/24 |
| 10,432,511 | B2 * | 10/2019 | Bifulco | G06F 21/75 |
| 10,893,095 | B1 | 1/2021 | Taaghol et al. | |
| 11,496,396 | B1 | 11/2022 | Kunc et al. | |

(Continued)

OTHER PUBLICATIONS

International Search Report and Written Opinion mailed May 25, 2023 in International Application No. PCT/US2023/061586.

(Continued)

*Primary Examiner* — Hashim S Bhatti

(74) *Attorney, Agent, or Firm* — Knobbe, Martens, Olson & Bear, LLP

(57) ABSTRACT

Proposed is a system for providing seamless communication between end DSDN nodes, such as satellites, unmanned aircraft systems (UAS), and base stations. These end DSDN nodes are connected with each other in a single global communication link. Each end DSDN node includes a smart routing system, and the system is configured to optimize routing paths to provide seamless connectivity by implementing advanced routing features, such as performance-enhancing proxy, quality of service, link aggregation, and link failure. In addition, the smart routing system can include a reprogrammable network processor and can reconfigure the network functionality of the end DSDN node by reconfiguring its functionality as a switch, proxy, or router based on the optimized routing paths.

12 Claims, 17 Drawing Sheets

(56) References Cited

U.S. PATENT DOCUMENTS

| | | | |
|---|---|---|---|
| 11,924,104 B2 | 3/2024 | Kunc et al. | |
| 2010/0125901 A1* | 5/2010 | Bathrick | H04L 45/00 726/13 |
| 2013/0028257 A1* | 1/2013 | Ludwick | H04L 69/165 370/392 |
| 2017/0085486 A1 | 3/2017 | Chung et al. | |
| 2019/0069187 A1 | 2/2019 | Ashrafi | |
| 2019/0260714 A1 | 8/2019 | Heo | |
| 2020/0374707 A1 | 11/2020 | Ashrafi | |
| 2022/0021613 A1 | 1/2022 | Venkatasubbalah et al. | |

OTHER PUBLICATIONS

Zerrick et al., "Towards a decentralized and adaptive software-defined networking architecture", 2014 International Conference on Next generation Networks and Services (NGNS), 2014, pp. 326-329.

* cited by examiner

200B

600

SMART NETWORK ROUTING SYSTEM

CROSS-REFERENCE TO RELATED APPLICATION

This application claims the benefits of U.S. Provisional Patent Application No. 63/585,769, entitled "MODULAR NETWORK SYSTEM," filed on Sep. 27, 2023, and U.S. Provisional Patent Application No. 63/585,772, entitled "SMART NETWORK ROUTING SYSTEM," filed on Sep. 27, 2023, the disclosures of each of which are hereby incorporated by reference in their entireties and for all purposes.

BACKGROUND

Technical Field

The described technology generally relates to a network routing system.

Description of Related Technology

As the demand for the use of wireless communication increases, a variety of wireless communication infrastructure and data link standards are being developed and widely used not only in commercial but also in military applications. To use the infrastructures and data link standards more efficiently, a wireless network robustness in dynamic wireless communication network topologies is required. A software-defined network ("SDN") is a well-known technology in wireless communication networks to provide wireless communication network robustness.

SUMMARY

The embodiments disclosed herein each have several aspects, no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices, and methods for processing items in a distribution network.

One aspect is a distributed software-defined network (DSDN) system for communicating data in a DSDN, including a plurality of DSDN nodes.

In the above system, the DSDN system comprises a source DSDN node. The source DSDN node is configured to receive a plurality of external datasets, each external dataset comprising at least a transmission control protocol (TCP) header and a data payload, from one or more external devices, wherein the TCP header comprises at least a time stamp that indicates a transmission time of the external dataset and destination DSDN node information and combine the received plurality of external datasets in a sequence of a received time of each external dataset.

In the above system, the source DSDN is configured to, for each external dataset, identify the data payload; determine delay time information from the time stamp included in the TCP header and the received time; add the delay time information to the data payload; and generate a data segment by duplicating the data payload and the added delay time information. The source DSDN is further configured to transmit the data segment to a destination DSDN node included in the destination DSDN node information.

In the above system, the destination DSDN node information includes additional destination DSDN nodes. In addition, the source DSDN node can be configured to duplicate the data payload and the added time information corresponds to a number of destination DSDN nodes.

In the above system, the delay time information is added to each data payload in a form of a delay tolerant network (DTN) header.

In the above system, the source DSDN node is further configured to determine the delay time information by identifying a time difference between the time stamp included in the TCP header and the received time. In addition, the source DSDN node can also be configured to adjust the determined delay time information by adding a network path latency between the source DSDN node and the destination DSDN node.

In the above system, the one or more external devices are communicatively coupled with the DSDN source node via a network outside of the DSDN.

In the above system, the source DSDN node comprises a satellite, and wherein the destination DSDN node comprises a ground station.

In the above system, the data segment is configured to be transmitted to the destination DSDN node via a modem connected to a physical network layer of the DSDN source node.

In the above system, the destination DSDN node information includes an address or name associated with the destination DSDN node.

In the above system, the source DSDN node is further configured to establish a communication path with the destination DSDN node based on routing information predefined in a data layer of the source DSDN node.

Another aspect is a distributed software-defined network (DSDN) system for communicating data in a DSDN, including a plurality of DSDN nodes, the system comprises a source DSDN node configured to: receive a plurality of external datasets, each external dataset comprising at least a transmission control protocol (TCP) header and a data payload, from one or more external devices, wherein the TCP header comprises at least a time stamp that indicates a transmission time of the external dataset and destination DSDN node information and combine the received plurality of external datasets in a sequence of a received time of each external dataset.

In the above system, the source DSDN is configured to, for each external dataset, identify the data payload; determine delay time information from the time stamp included in the TCP header and the received time; add the delay time information to the TCP header corresponding to the data payload; and generate a data segment by duplicating the data payload and the added delay time information.

In the above system, the source DSDN is configured to select one or more routing devices from a plurality of routing devices included in the source DSDN node, wherein the selected one or more routing devices are communicatively connected to a destination DSDN node identified from the destination DSDN node information, and wherein the one or more routing devices are configured to be selected based on performance status of each routing devices of the plurality of routing devices; and transmit the data payloads of each external dataset to the destination DSDN node via the selected one or more routing devices.

In the above system, the source DSDN node is further configured to monitor a performance status of the selected one or more routing devices while transmitting the data payloads to the destination DSDN node. In addition, the source DSDN node can also be further configured to, in response to determining that at least one of the selected one or more routing devices is experiencing a performance degradation, reselect one or more routing devices from the plurality of routing devices.

In the above system, the source DSDN node is further configured to monitor the performance status in real time, and wherein the performance status comprises a utilization rate, an available bandwidth, and an available networking capacity of each routing device.

In the above system, the source DSDN node comprises a satellite, and wherein the destination DSDN node comprises a ground station.

In the above system, the destination DSDN node information includes an address or name associated with the destination DSDN node.

In the above system, the source DSDN node is further configured to establish a communication path with the destination DSDN node based on routing information predefined in a data layer of the source DSDN node.

In the above system, the one or more external devices are communicatively coupled with the source DSDN node via a network outside of the DSDN. In addition, the one or more external devices can be communicatively coupled with the source DSDN node via a network outside of the DSDN.

Another aspect is a method of communicating data in a DSDN, including a plurality of DSDN nodes, and the method comprises receiving a plurality of external datasets, each external dataset comprising at least a transmission control protocol (TCP) header and a data payload, from one or more external devices, wherein the TCP header comprises at least a time stamp that indicates a transmission time of the external dataset and destination DSDN node information, the destination DSDN node information comprising one or more destination DSDN nodes; and combining the received plurality of external datasets in a sequence of a received time of each external dataset.

In the above aspect, the method further comprises, for each external dataset, identifying the data payload; determining delay time information from the time stamp included in the TCP header and the received time; adding the delay time information to the data payload in a form of a delay tolerant network (DTN) header; and generating data segments by duplicating the data payload and the added time information, wherein a number of the data segments and duplication corresponds to a number of the one or more destination DSDN nodes. Then, the method further comprise transmitting each data segment of the generated data segments to one destination DSDN node of the one or more destination DSDN nodes.

Another aspect is a smart network routing system and method for providing a seamless wireless network connection between various networking devices, each of which is configured with a different wireless communication standard.

Another aspect is a method of providing a seamless data communication between a plurality of network devices having different wireless communication standards. In this aspect, the method comprises obtaining one or more datasets from one or more networking devices, wherein each of the one or more datasets comprises a time sequence; combining the obtained datasets based on the time sequence of each dataset; identifying a data payload of each of the one or more obtained datasets; adding delayed time information to identified data payloads, wherein the delayed time information is determined at least based on header information of each of the one or more obtained datasets; duplicating each of the data payloads, wherein a number of duplication corresponds to a number of modems; and transmitting the duplicated data payloads to a destination DSDN node, wherein a transmission time sequence is determined based at least on the delayed time information for each data payload.

Another aspect is a method of providing a seamless data communication between a plurality of network devices having different wireless communication standards. In this aspect, the method comprises obtaining one or more datasets from one or more networking devices, wherein each of the one or more datasets comprises a time sequence; combining the obtained datasets based on the time sequence of each dataset; identifying a data payload of each of the one or more obtained datasets; adding delayed time information to identified data payloads, wherein the delayed time information is determined at least based on header information of each of the one or more obtained datasets; assigning the data payloads respectively to a plurality of modems, wherein the assignment is based on the delayed time information for each data payload and time latency of each of the plurality of modems; and transmitting the data payloads based on the assignment.

Another aspect is a method of providing a seamless data communication between a plurality of network devices having different wireless communication standards. In this aspect, the method comprises obtaining one or more datasets from one or more networking devices, wherein each of the one or more datasets comprises a time sequence; combining the obtained datasets based on the time sequence of each dataset; identifying a data payload of each of the one or more obtained datasets; adding delayed time information to identified data payloads, wherein the delayed time information is determined at least based on header information of each of the one or more obtained datasets; providing one or more modems; selecting a modem from the one or more modems to transmit the data payloads, wherein each data payload includes corresponding delayed time information; initiating transmission of the data payloads via the selected modem; determining whether the transmission of the data payloads is completed; in response to determining that the transmission is not completed, determining whether performance of the selected modem is decreased to a threshold; and in response to determining that the performance of the selected modem is decreased to the threshold, selecting another modem.

Another aspect is a system for providing a seamless communication between a plurality of networking devices having different wireless communication standards. In this aspect, the system comprises a memory storing instructions and a processor configured to execute the instructions to perform a method of obtaining one or more datasets from one or more networking devices, wherein each of the one or more datasets comprises a time sequence; combining the obtained datasets based on the time sequence of each dataset; identifying a data payload of each of the one or more obtained datasets; adding delayed time information to identified data payloads, wherein the delayed time information is determined at least based on header information of each of the one or more obtained datasets; duplicating each of the data payloads, wherein a number of duplication corresponds to a number of modems; and transmitting the duplicated data payloads to a destination DSDN node, wherein a transmission time sequence is determined based at least on the delayed time information for each data payload.

Another aspect is a system for providing a seamless communication between a plurality of networking devices having different wireless communication standards. In this aspect, the system comprises a memory storing instructions and a processor configured to execute the instructions to perform a method of obtaining one or more datasets from one or more networking devices, wherein each of the one or more datasets comprises a time sequence; combining the obtained datasets based on the time sequence of each dataset; identifying a data payload of each of the one or more obtained datasets; adding delayed time information to identified data payloads, wherein the delayed time information is determined at least based on header information of each of the one or more obtained datasets; assigning the data payloads respectively to a plurality of modems, wherein the assignment is based on the delayed time information for each data payload and time latency of each of the plurality of modems; and transmitting the data payloads based on the assignment.

Another aspect is a system for providing a seamless communication between a plurality of networking devices having different wireless communication standards. In this aspect, the system comprises a memory storing instructions and a processor configured to execute the instructions to perform a method of obtaining one or more datasets from one or more networking devices, wherein each of the one or more datasets comprises a time sequence; combining the obtained datasets based on the time sequence of each dataset; identifying a data payload of each of the one or more obtained datasets; adding delayed time information to identified data payloads, wherein the delayed time information is determined at least based on header information of each of the one or more obtained datasets; providing one or more modems; selecting a modem from the one or more modems to transmit the data payloads, wherein each data payload includes corresponding delayed time information; initiating transmission of the data payloads via the selected modem; determining whether the transmission of the data payloads is completed; in response to determining that the transmission is not completed, determining whether performance of the selected modem is decreased to a threshold; and in response to determining that the performance of the selected modem is decreased to the threshold, selecting another modem.

Another aspect is a non-transitory computer readable recording medium storing instructions. The instructions, when executed by one or more processors, configured to perform a method of obtaining one or more datasets from one or more networking devices, wherein each of the one or more datasets comprises a time sequence; combining the obtained datasets based on the time sequence of each dataset; identifying a data payload of each of the one or more obtained datasets; adding delayed time information to identified data payloads, wherein the delayed time information is determined at least based on header information of each of the one or more obtained datasets; duplicating each of the data payloads, wherein a number of duplication corresponds to a number of modems; and transmitting the duplicated data payloads to a destination DSDN node, wherein a transmission time sequence is determined based at least on the delayed time information for each data payload.

Another aspect is a non-transitory computer readable recording medium storing instructions. The instructions, when executed by one or more processors, configured to perform a method of obtaining one or more datasets from one or more networking devices, wherein each of the one or more datasets comprises a time sequence; combining the obtained datasets based on the time sequence of each dataset; identifying a data payload of each of the one or more obtained datasets; adding delayed time information to identified data payloads, wherein the delayed time information is determined at least based on header information of each of the one or more obtained datasets; assigning the data payloads respectively to a plurality of modems, wherein the assignment is based on the delayed time information for each data payload and time latency of each of the plurality of modems; and transmitting the data payloads based on the assignment.

Another aspect is a non-transitory computer readable recording medium storing instructions. The instructions, when executed by one or more processors, configured to perform a method of obtaining one or more datasets from one or more networking devices, wherein each of the one or more datasets comprises a time sequence; combining the obtained datasets based on the time sequence of each dataset; identifying a data payload of each of the one or more obtained datasets; adding delayed time information to identified data payloads, wherein the delayed time information is determined at least based on header information of each of the one or more obtained datasets; providing one or more modems; selecting a modem from the one or more modems to transmit the data payloads, wherein each data payload includes corresponding delayed time information; initiating transmission of the data payloads via the selected modem; determining whether the transmission of the data payloads is completed; in response to determining that the transmission is not completed, determining whether performance of the selected modem is decreased to a threshold; and in response to determining that the performance of the selected modem is decreased to the threshold, selecting another modem.

Another aspect is a modular network system and method for providing a seamless wireless network connection between various networking devices, each of which is configured with a different wireless communication standard.

Another aspect is a method of communicating data in a communication network, including two or more computer nodes.

In the above method, the method comprises receiving a request to send data packets from a transmission node; estimating one or more congestion conditions of a network path connected to the transmission node; determining a latency based on the estimated congestion conditions; replying to the transmission node to initiate transmission of the data packets; and in response to determining the transmission of the data packets initiated, applying the determined latency as a buffering time while receiving the data packets from the transmission node.

In the above method, the latency includes a communication latency and a computational latency.

In the above method, the request includes a time stamp corresponding to transmission time of the request.

In the above method, the congestion conditions are estimated by monitoring network resources of the network path.

In the above method, the method is performed in a receiving node, and the transmission node and the receiving node are included in a distributed software defined network.

In the above method, the method is performed in a modular network system of a receiving node.

Another aspect is a system for communicating data in a communication network, including two or more computer nodes.

In the above system, the system comprises a memory storing instructions and a processor configured to execute the instructions to perform the method of receiving a request to send data packets from a transmission node, estimating one or more congestion conditions of a network path connected to the transmission node, determining a latency based on the estimated congestion conditions, replying to the transmission node to initiate transmission of the data packets, and in response to determining the transmission of the data packets initiated, applying the determined latency as a buffering time while receiving the data packets from the transmission node.

Another aspect is a non-transitory computer readable recording medium for storing instructions that provides a method of communicating data in a communication network, including two or more computer nodes.

In the above instructions, the instructions are executed by one or more processors to perform the method of receiving a request to send data packets from a transmission node, estimating one or more congestion conditions of a network path connected to the transmission node, determining a latency based on the estimated congestion conditions, replying to the transmission node to initiate transmission of the data packets, and in response to determining the transmission of the data packets initiated, applying the determined latency as a buffering time while receiving the data packets from the transmission node.

Any of the features of an aspect is applicable to all aspects identified herein. Moreover, any of the features of an aspect is independently combinable, partly, or wholly, with other aspects described herein in any way, e.g., one, two, or three or more aspects may be combinable in whole or in part. Further, any of the features of an aspect may be made optional to other aspects. Any aspect of a method can comprise another aspect of a system. Furthermore, any aspect of a system can be configured to perform a method of another aspect.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Figure 1:
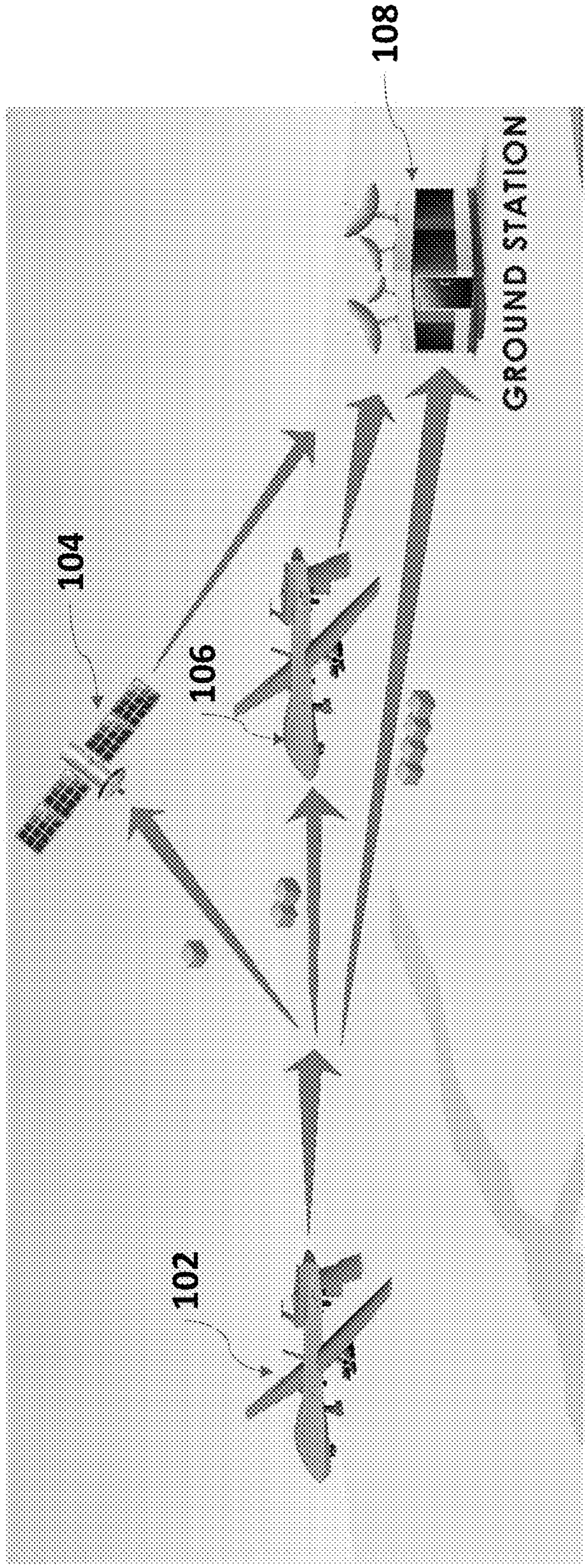
FIG. 1 illustrates an example of a smart routing system in accordance with some embodiments.

Provided herein are various embodiments of systems and methods for dynamically configuring wireless communication paths to end user devices based on a single data link (e.g., a common data link format). The embodiments discussed herein include a smart routing system designed to provide seamless network connectivity across a vast network coverage area, such as a global network. For instance, the smart routing system could be embedded in an aerial vehicle, such as an unmanned aerial vehicle (UAV), which can receive multiple wireless communication signals from various platforms, including other aerial vehicles, ground stations, vessels, and more. In this scenario, the smart routing system within the UAV can provide seamless routing to end-user network devices (e.g., a ground station) by aggregating these wireless signals and directing them to the appropriate end-user devices.

In addition, various embodiments of systems and methods for establishing a common wireless communication path between network devices are disclosed herein. The embodiments discussed herein involve a modular network system, implemented in a network device, which enables the establishment of a common wireless communication pathway among various network devices. Each of these devices can be configured to wirelessly communicate with others using a specific network standard. By employing the modular network system, a network device can create a common network path with other devices, each of which may be configured with a different network standard. For instance, devices incorporating the modular network system can be connected through this common network path. In this scenario, each device receives data from others in their respective network communication standards. The modular network system in each device then converts the received data into a common network standard associated with the common network path. Consequently, all these network devices can communicate with each other by establishing this common network path.

In some aspects, the smart routing system, when implemented in a network device, can receive wireless signals in various data link formats and convert them into a single data link format (e.g., a common data link format). For instance, a network device equipped with the smart routing system can receive wireless signals-such as those carrying data packets—in diverse data link formats. These include satellite communication (SATCOM), military data link formats (e.g., Link-16, 22, tactical data link), and commercial data link formats (e.g., commercial cellular, Wi-Fi, Internet of Things). In this scenario, the smart routing system can aggregate this data, convert it into a single common data link format, and route it to its corresponding destination end-user device.

Various embodiments discussed herein also include a distributed software-defined network ("DSDN") for deploying the smart routing system. For instance, multiple DSDN nodes can be deployed within a DSDN, each equipped with the smart routing system. Each DSDN node can form a sub-network with other network devices, allowing the DSDN node to receive data in various formats from these devices. The smart routing system within the DSDN node can process the received data by converting it into a single common data link format. Subsequently, the smart routing system identifies the destinations corresponding to each set of data and transmits this data to other DSDN nodes associated with these destinations.

Traditionally, a software-defined network (SDN) is commonly employed to facilitate seamless network connections and routing among network devices. The SDN utilizes a programmable network architecture, which can be controlled via software applications. This architecture is based on a centralized network model, with a central DSDN node within the SDN that can configure an efficient network setup to enhance SDN performance. This central DSDN node may contain an SDN controller, which can also be referred to as a "master SDN controller DSDN node." In a typical SDN, the master SDN controller DSDN node is programmed to manage the entire network. For instance, it can make data routing decisions, forward data packets to their destination DSDN nodes, or alter the network configuration by adding or removing DSDN nodes. Therefore, all data generated within this SDN is transmitted to the master SDN controller DSDN node. Based on the data routing decisions, this master DSDN node then routes the data to its respective destinations.

SDNs are built upon reliable network infrastructures and static topologies, necessitating continuous connectivity to the master SDN controller DSDN node. For instance, the SDN requires that the master SDN controller DSDN node maintains connections with all other DSDN nodes within the network. If the master SDN controller DSDN node becomes disconnected from other DSDN nodes due to changes in network environments or range limitations, the entire SDN is disrupted. Consequently, SDNs are not efficient for use in diverse and dynamic network topologies. Moreover, an SDN is not a robust network structure. For example, when the master SDN controller DSDN node receives data beyond its processing capacity, it may be unable to process the incoming data. This could result in higher latencies, increased utilization of network resources, elevated error rates, and other issues. Such weaknesses can pose significant problems in dynamic network environments, such as those found in IoT, military, space, or other ad hoc applications. Therefore, there is a need for systems and methods that can provide seamless routing in dynamic network configuration environments.

In addition, traditional network devices utilize the transmission control protocol (TCP)/internet protocol (IP) model for communication. However, this traditional TCP/IP model becomes vulnerable when an increased number of network devices join a network. For instance, two distinct network constellations, like satellite network devices and ground network devices (e.g., multiple mobile phones), may communicate with each other using the TCP/IP model. This model may not withstand high latencies caused by the communication ranges between these two types of devices, such as the distance between satellites and mobile phones. For example, the TCP/IP model requires an acknowledgment message before sending the next packet. If the latency is high, e.g., seconds, the total time for sending all data packets from the satellites to mobile phones could be several seconds or even minutes. In one scenario, if a satellite sends data divided into 10 packets and the latency between the satellite and mobile phone is 2 seconds, the total latency for sending the data to the mobile phone would exceed 40 seconds. In another scenario, the latencies between these two distinct network constellations can continuously vary. For instance, each satellite in a constellation might be constantly moving, leading to fluctuating latency. Therefore, if these two distinct network constellations are communicating with each other, a high volume of data packets would be generated in real-time in both constellations, and the TCP/IP model might not be able to handle this network data throughput. Moreover, if there are errors in receiving or transmitting packets, it could generate even higher latencies. Additionally, if another network device or group of devices joins the existing network, the latency problem associated with the TCP/IP model could worsen. Therefore, the TCP/IP model is inefficient to use in a variety of disparate and dynamic network topologies. Furthermore, the TCP/IP model can be problematic and inoperable in a dynamic network environment found in IoT, military, space, or other ad-hoc applications. In addition, the TCP/IP model cannot tolerate when the number of network devices increasing. Accordingly, there is a need for systems and methods for dynamically configuring and managing a wireless communication network in various environments that requires wireless communication between a high number of network devices (or group of network devices) and between various wireless networking devices that use different wireless communication infrastructures and data link standards.

In the following detailed description, reference is made to the accompanying drawings, which form a part hereof. In the drawings, similar symbols typically identify similar components unless context dictates otherwise. Thus, in some embodiments, part numbers may be used for similar components in multiple figures, or part numbers may vary from figure to figure. The illustrative embodiments described in the detailed description, drawings, and claims are not meant to be limiting. Some embodiments may be utilized, and other changes may be made without departing from the spirit or scope of the subject matter presented here. It will be readily understood that the aspects of the present disclosure, as generally described herein and illustrated in the Figures, can be arranged, substituted, combined, and designed in a wide variety of different configurations, all of which are explicitly contemplated and made part of this disclosure.

Reference in the specification to "one embodiment," "an embodiment," or "in some embodiments" means that a particular feature, structure, or characteristic described in connection with the embodiment is included in at least one embodiment of the invention. Moreover, the appearance of these or similar phrases throughout the specification does not necessarily all refer to the same embodiment, nor are separate or alternative embodiments necessarily mutually exclusive. Various features are described herein, which may be exhibited by some embodiments and not by others. Similarly, various requirements are described, which may be requirements for some embodiments but may not be requirements for other embodiments.

As described in detail herein, aspects of the present disclosure relate to a smart routing system and, in particular, to a system and method for seamlessly routing data in a dynamically changing network configuration environment. The smart networking system has an architecture that can be executed on a variety of network processing architectures, such as general-purpose processors or field-programmable gate arrays. The smart networking system can ensure its robustness and reliability by providing an architecture that is tolerant of network interruptions and network system fluctuations.

Aspects of the present disclosure provide a technical solution to the traditional routing system in the SDN caused by a centralized network, where a master SDN controller DSDN node controls the entire SDN. More specifically, aspects of the present disclosure relate to routing the data to its destination by reducing interdependency between the master SDN controller DSDN node and other DSDN nodes. In various aspects of the present disclosure, the smart routing system is implemented in the DSDN nodes deployed in the DSDN.

The smart routing system can be configured to convert various disparate data formats (e.g., data received in various data links, such as various data link standards) into a common data format (hereinafter “a common data ling standard”). For example, a modular network system may translate the various formats, and data packets within the formats may be converted into a common data link format.

In some embodiments, the smart routing system can aggregate data received via various data links and then route this aggregated data to its destination DSDN node. For instance, the smart routing system may receive data from various network devices in different data link formats. It can then aggregate this data by identifying the data packets included in each received data link format and encapsulating them into a common data link format. In some scenarios, the smart routing system may aggregate data based on each data packet’s destination DSDN node. For example, when the smart routing system receives data from other network devices, it identifies the destination for each data packet and aggregates the data accordingly. This process ensures efficient and targeted routing of data in the network.

In some aspects of the present disclosure, the smart routing system can be implemented in the network device by employing a distributed software-defined network (“DSDN”) network architecture. In DSDN architectures, the control and data planes of each DSDN architecture can be logically separated. Each DSDN architecture may include a controller. The controller may control a control plane of the DSDN architecture. The controller can manage the network configuration (e.g., a network that includes a plurality of DSDN nodes, such as equivalent to the network device, including the smart routing system), such as adding or removing another DSDN node (e.g., equivalent to the network device that includes the smart routing system). The controller also can add or remove its DSDN node to or from another DSDN node. The controller can dynamically reconfigure the configuration of the DSDN node in response to any network environment change. For example, suppose a DSDN node is disconnected from the remaining DSDN nodes in the DSDN system due to a range limitation. In that case, the controller of the DSDN node can reconnect the DSDN node to one of the neighboring DSDN nodes, so the DSDN node is seamlessly connected to the DSDN network. The controller may translate a variety of data formats into a standard IP protocol to be communicated within the DSDN. The controller may optimally route data across the DSDN to a DSDN destination DSDN node, calculating the communication path quality, including, but not limited to, path cost, bandwidth, latency, link aggregation, redundancy, and so on, where the controller monitors the factors in real-time. The control plane of each DSDN node generally includes one or more control plane components distributed across and implemented by one or more control servers. The control plane components are typically implemented on separate servers and may be responsible for network configuration rules. While the data plane represents the movement of user data through the distributed computing system, the control plane can represent the movement of control signals through the distributed computing system. The control plane may also include network control information including, but is not limited to, configuration rules, a function for data packet conversion, data packet routing rules, etc. The description of the DSDN is included in U.S. Pat. No. 11,496,396, titled “DISTRIBUTED SOFTWARE-DEFINED NETWORK,” which is hereby incorporated by reference in its entirety.

As described in detail herein, aspects of the present disclosure also relate to a modular networking system and, in particular, to a system and method for dynamically configuring a wireless communication network by establishing a common network path between network devices that includes the modular networking system. The modular networking system has an architecture that can be executed on a variety of network processing architectures, such as general-purpose processors or field-programmable gate arrays. The modular networking system can ensure its robustness and reliability by providing an architecture that is tolerant of network communication latencies, interruptions, and network system fluctuations.

Some aspects of the present disclosure provide a technical solution to the TCP/IP model that cannot tolerate communication latencies between various wireless networking devices that use different wireless communication infrastructures and data link standards. More specifically, aspects of this disclosure pertain to a modular network system that can establish a common network path. This path facilitates communication between various wireless networking devices that use different wireless communication infrastructures and data link standards, and the path may be tolerant to network communication latencies, interruptions, and system fluctuations.

The modular network system can be configured to convert various disparate data formats (e.g., data received in various data links, such as various data link standards) into a common data format (hereinafter “a common data standard”). For example, a modular network system may translate the various formats, and data packets within the formats may be encapsulated into a common format, such as a standard internet protocol (IP) format.

The modular network system can also establish a common network path with other network devices that implement the modular network system. For example, the common data format can be used across a common network path. For example, a network device, by utilizing its implemented modular network system, can convert a disparate data format (e.g., data received via various data links) into the common data format and transmit the converted data via the established common network path. In some embodiments, the common network path is a virtual network path. For example, the common network path can be established by utilizing internet protocol. Illustratively, each network device that includes the modular network system is assigned with a specific IP address. Then, the common network path can be established by designating the source (e.g., origin) and destination IP addresses associated with the network devices. Furthermore, the routing can be designated by assigning the IP addresses associated with the routing path between the source network device and the destination network device.

In some aspects of the present disclosure, the modular network system can also be implemented in the network device by employing a distributed software-defined network ("DSDN") network architecture.

In some aspects of the modular network system, the system can be configured to tolerate latencies by estimating each latency. For example, the modular network system can store the data packets and forward the data packets by determining network congestion within the network. In some aspects of the modular network system, the system can scale the data packets by reducing its payload data size, thus, allowing high scalability. In some aspects, the modular network system can be reconfigurable with various hardware platforms, such as satellites, space shuttle, IoT devices, traditional network devices, and the like.

Overview of Distributed Software-Defined Network (DSDN)

FIG. 1 illustrates an example of smart routing system in accordance with some embodiments. For simplicity and brevity, two UAVs (102, 106), a satellite (104), and a ground station (108) are depicted in FIG. 1. However, the types and numbers of network devices (UAVs, satellite, and ground station) presented are not restrictive in the present disclosure and can be determined based on specific applications. The UAVs (102, 106), satellite (104), and ground station (108) shown in FIG. 1 are equipped with the smart routing system. In this scenario, the smart routing system within UAV (102) has data to send to its destination, the ground station (108). In some embodiments, the smart routing system within UAV (102) can identify routing paths to the ground station (108). For instance, the smart routing system in UAV 102 may identify a first path (via the satellite (104)), a second path (via another UAV (106)), and a third path that directly connects to the ground station 108. In some embodiments, the smart routing system in UAV 102 continuously monitors the status of these three paths, such as path status parameters. Based on this monitored path status, the smart routing system in UAV 102 can maintain a seamless connection to the ground station 108. For example, if UAV 102 is in flight and the distance to the ground station 108 increases, the smart routing system in UAV 102 may seamlessly switch to the second or third path."

Figure 2A:
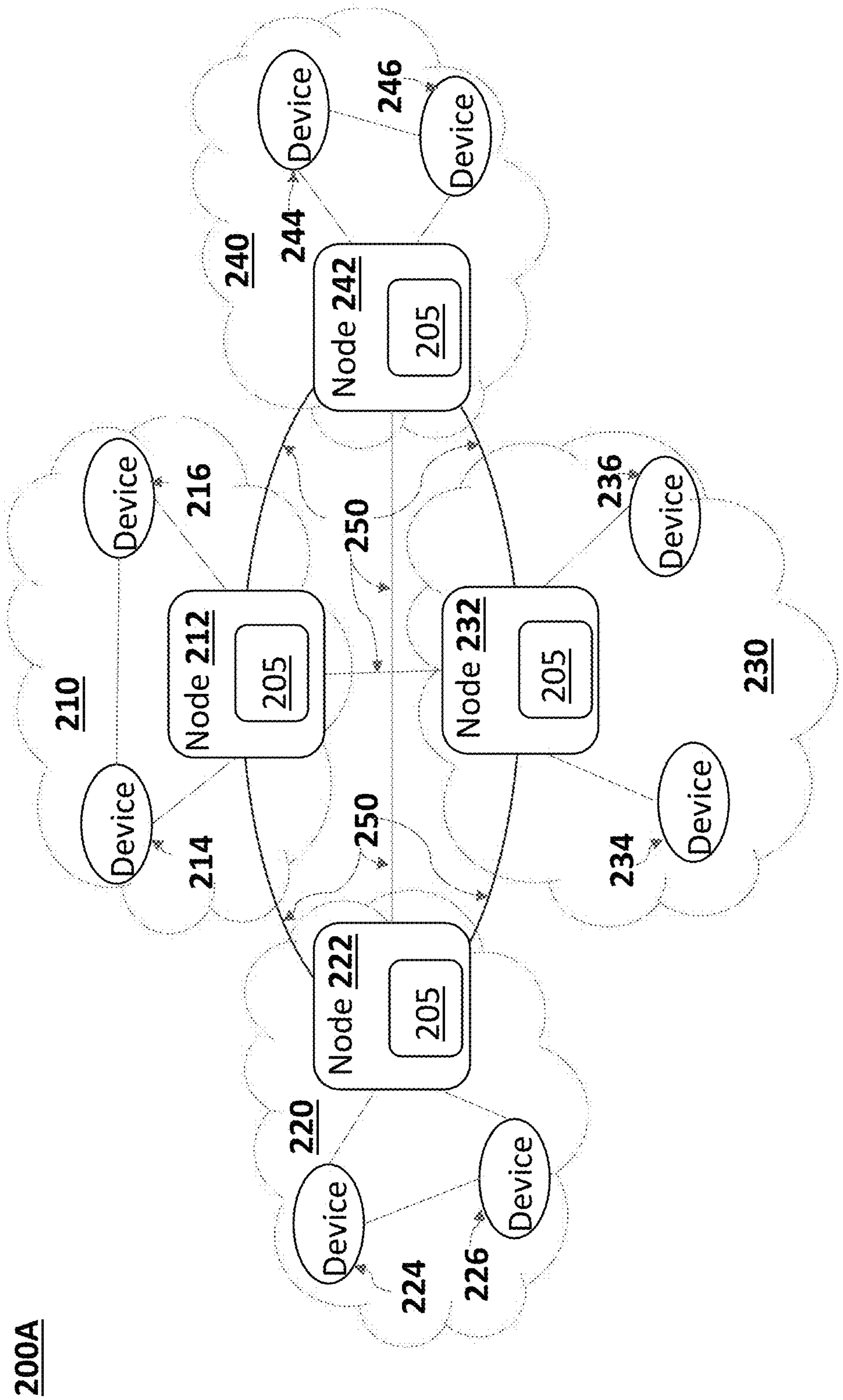
FIG. 2A shows an example of a distributed software-defined network ("DSDN") configuration in accordance with some embodiments.
Figure 2B:
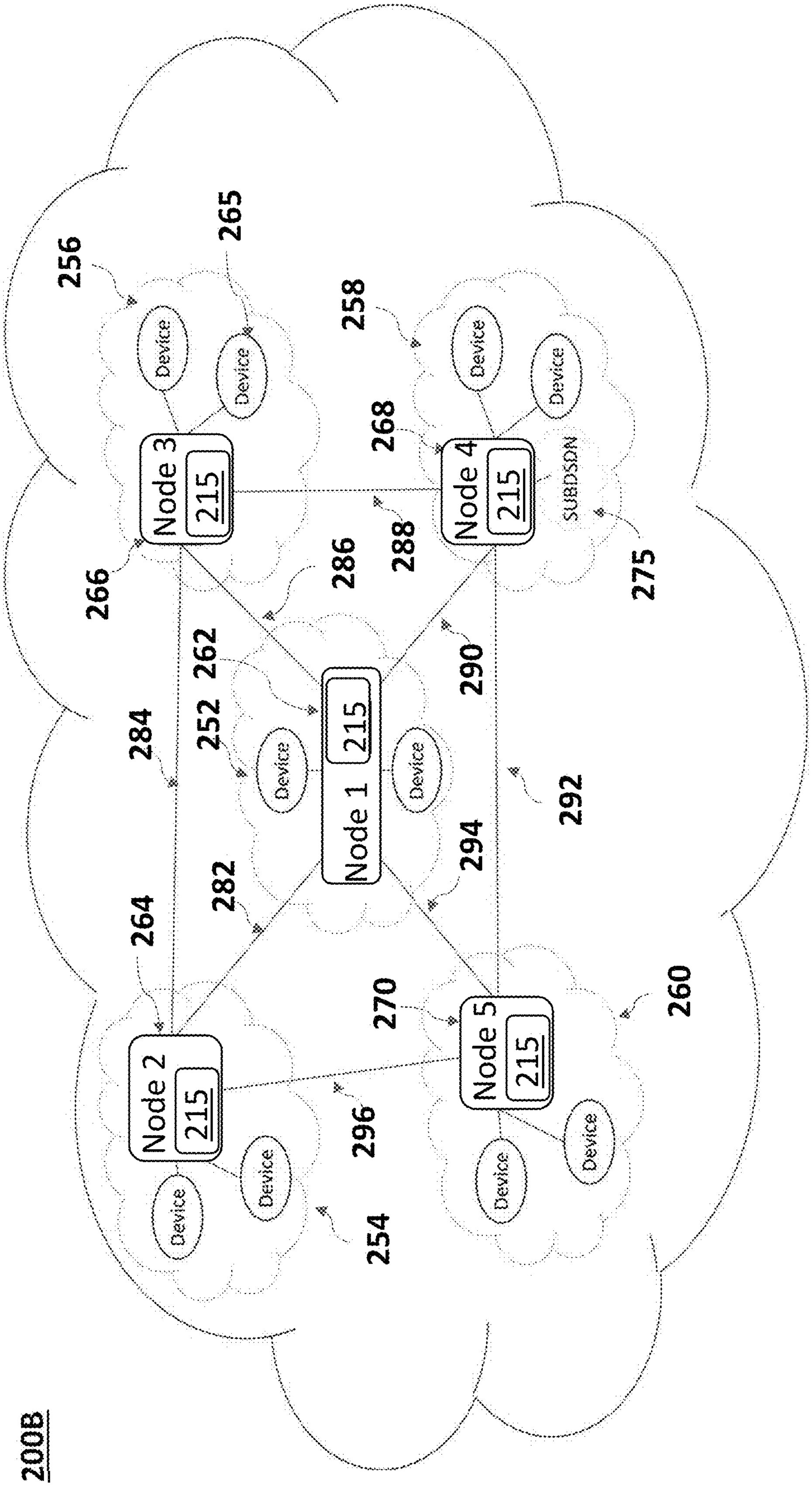
FIG. 2B shows an example of a distributed software-defined network ("DSDN") configuration in accordance with some embodiments.

FIGS. 2A and 2B illustrate examples of distributed software-defined network ("DSDN") network configurations. For example, FIG. 2A illustrates a DSDN network, including 4 DSDN nodes, where each DSDN node forms a sub-network different from the DSDN network. FIG. 2B illustrates a DSDN network, including 5 DSDN nodes, where each DSDN node forms a sub-network different from the DSDN network. For the purpose of convenience and brevity, FIGS. 2A and 2B illustrate configurations with four or five DSDN nodes. However, these configurations are merely provided as examples, and the present disclosure does not limit the numbers of DSDN nodes, sub-networks, and communication paths between the DSDN nodes. Furthermore, the present disclosure does not limit the types of network and/or electrical devices and platform the implements such network and/or electrical devices.

FIG. 2A shows an example DSDN network configuration with 4 DSDN nodes (212, 222, 232, and 242). As shown in FIG. 2A, each DSDN node (212, 222, 232, and 242) is joined in sub-networks (210, 220, 230, and 240), respectively. The DSDN nodes (212, 222, 232, and 242) respectively include or communicate with devices (214, 216), (224, 226), (234, 236), and (244, 246), respectively. These devices can be part of each DSDN node or can be separately provided and connected to an interface of the DSDN node. Each of the devices can include a sensor, a mobile device, a computer, an internet on thing (IoT) device, an avionics system, a server, a terminal, a modem, or a satellite, a vehicle, a vessel, etc. The device is not limited to any of the example devices described above and can be determined based on a particular application.

Although FIG. 2A shows that each sub-network or each DSDN node includes two devices, the present disclosure is not limited thereto. For example, each sub-network may include or be connected to one device, or three or more devices. In a scenario, the sub-network can be a constellation of satellites or mobile devices. The DSDN nodes (212, 222, 232, and 242) included in the respective sub-networks (210, 220, 230, and 240) can be the same type of device included in each respective sub-networks. For example, the DSDN node 212 can be the same type as the devices (214, 216). The DSDN nodes (212, 222, 232, and 242) can be distinguishable from the devices by implementing a modular network system (205).

As further shown in FIG. 2A, the DSDN nodes (212, 222, 232, and 242) can include a modular network system (or a modular network processor) (205). In some embodiments, the modular network system (205) can provide a common network path 250, and the DSDN nodes (212, 222, 232, and 242) are communicatively coupled via the common network path 250. Illustratively, each sub-network (210, 220, 230, and 240) is configured with a dedicated data link standard (e.g., the data link standard different from the data link utilized in the common network path 250), such that the devices and a DSDN node included in each sub-networks (210, 220, 230, and 240) can communicate with each other via the dedicated data link standard. Thus, in some embodiments, when the DSDN node does not include the modular network system, the device may not communicate with other devices included in another sub-network. For example, when the DSDN node 242 does not include the modular network system 205, the devices 244 and 246 may not communicate with other devices included in other sub-networks (210, 220, and 230).

The modular network system (205), as shown in FIG. 2A, can be configured to receive and/or transmit data or data packets in various data link formats and convert these various data link formats into a common data standard. For example, the modular network system (205) can process these various data or data packets and identify information, such as source, destination, payloads, etc. In some embodiments, the modular network system (205) generates a common data standard based on the identified information. The common data standard can be in the form of IP.

The modular network system (205) can establish the common network path (250). In some embodiments, this common network path (250) serves as a virtual network path. For instance, the common network path (250) can facilitate the communication of data in IP format. For example, when the DSDN node (212) receives data from the device (214) using its dedicated network, such as a link-16 datalink (for example), the modular network system (205) within the DSDN node (212) can process the data packet (encapsulated in link-16 datalink format) and identify the source, destination addresses, and the data packets. For example, upon identifying that the destination is device (224), the modular network system (205) within the DSDN node (212) may generate data packets by encapsulating them into IP format. This IP format can include the source DSDN node identification associated with the device (214), routing information related to the IP addresses of DSDN nodes (212 and 222), and the destination address of the device (224). As a result, the generated data packets from DSDN node (212) can be transmitted to DSDN node (222). Subsequently, the modular network system (205) within DSDN node (222) can convert the received data packets (e.g., data packets in the common data standard) into the dedicated data standard configured in the sub-network (220). The converted data can then be transmitted to the device (224).

In various embodiments, the modular network system (205) can monitor the congestion level of its DSDN node to minimize latency. For instance, consider a scenario where DSDN node (212) is a satellite and send data packets to DSDN node (242), which is a mobile device, for example. Assuming that the communication latency between DSDN node (212) and DSDN node (242) is in the order of seconds and that the congestion rate of DSDN node (242) exceeds its threshold, the modular network system (205) may request other DSDN nodes (222, 232) to receive the data packets from DSDN node (212) and forward them to DSDN node (242) upon completion of the data packet reception. In this scenario, when the DSDN node (222) has a lower congestion rate, the modular network system (205) within DSDN node (222) may receive the data packets from DSDN node (212) and forward the complete data packets to DSDN node (242). Consequently, in this scenario, the DSDN node (242) can tolerate the latencies without affecting its network performance.

In some embodiments, each DSDN node (212, 222, 232, and 242) can receive data packets in more than one data link formats and convert them into the common standard. For example, the device (234) may provide data packets to the DSDN node (232) in the form of data link A, and the device (236) may provide another set of data packets in a form of data link B. In this example, the DSDN node (232) can receive both sets of the data packets, and the modular network system 205 included in the DSDN node (232) may convert each set of the data packets into the common data standard. In some examples, the modular network system (205) included in the DSDN node (232) may combine these two sets of the data packets into a single set of data packets encapsulated in the common data standard.

FIG. 2B shows an example of a DSDN configuration (200B). For the purpose of convenience and brevity, the number of DSDN nodes or sub-networks in FIG. 2B is five. However, the present disclosure is not limited thereto. For example, the number of DSDN nodes/sub-networks can be more than or less than five and can be determined based on specific applications. As shown in FIG. 2B, the DSDN configuration (200B) includes DSDN sub-networks (252, 254, 256, 258, and 260). The DSDN sub-networks (252, 254, 256, 258, and 260) respectively include DSDN nodes (262, 264, 266, 268, and 270) and at least one device (265). The device (265) can be part of each DSDN node or can be separately provided and connected to an interface of the DSDN node. The device can include a sensor, a mobile device, a computer, an Internet on Thing (IoT) device, an avionics system, a server, a terminal, a modem, or a wide area network (WAN). The device is not limited to any of the example devices described above and can be determined based on a particular application.

Although FIG. 2A shows that each DSDN sub-network includes two devices, the present disclosure is not limited thereto. For example, each DSDN sub-network may include or be connected to one device, or three or more devices. Furthermore, at least two of the DSDN sub-networks may include different numbers of devices. Each DSDN node can be configured to receive data from the device. A DSDN node can communicate data with one or more of the remaining DSDN nodes in the DSDN configuration (200B). Although FIG. 2B shows only one DSDN configuration (200B), the present disclosure is not limited thereto. For example, two or more DSDNs may be provided, and these two more DSDNs may communicate data with each other.

Each DSDN node shown in FIG. 2B can include a smart routing system. In some embodiments, each DSDN node (262, 264, 266, 268, and 270) can include a controller 215 to implement the smart routing system in accordance with some embodiments disclosed herein. As shown in FIG. 2B, each DSDN node can be connected to nearby DSDN nodes. For example, DSDN node 1 (262) is directly or indirectly connected to DSDN nodes 2-5 (264, 266, 268, and 270), via communication paths (282, 284, 286, 288, 290, 292, 294, and 296). In some embodiments, each DSDN node is connected to neighboring DSDN nodes within more than one hop. For example, as shown in FIG. 2B, the DSDN node 2 (264) is connected to the first nearby DSDN nodes (270, 266, and 262) with one hop via a communication path (282, 284, and 286, respectively). In some embodiments, a DSDN node can connect to its neighboring DSDN nodes with two hops via two communication paths. For example, the DSDN node 2 (264) can be connected to DSDN node 3 (266) with two hops via two communication paths (282 and 286). The number of hops connecting two DSDN nodes can be defined based on specific applications and DSDN status.

Figure 4:
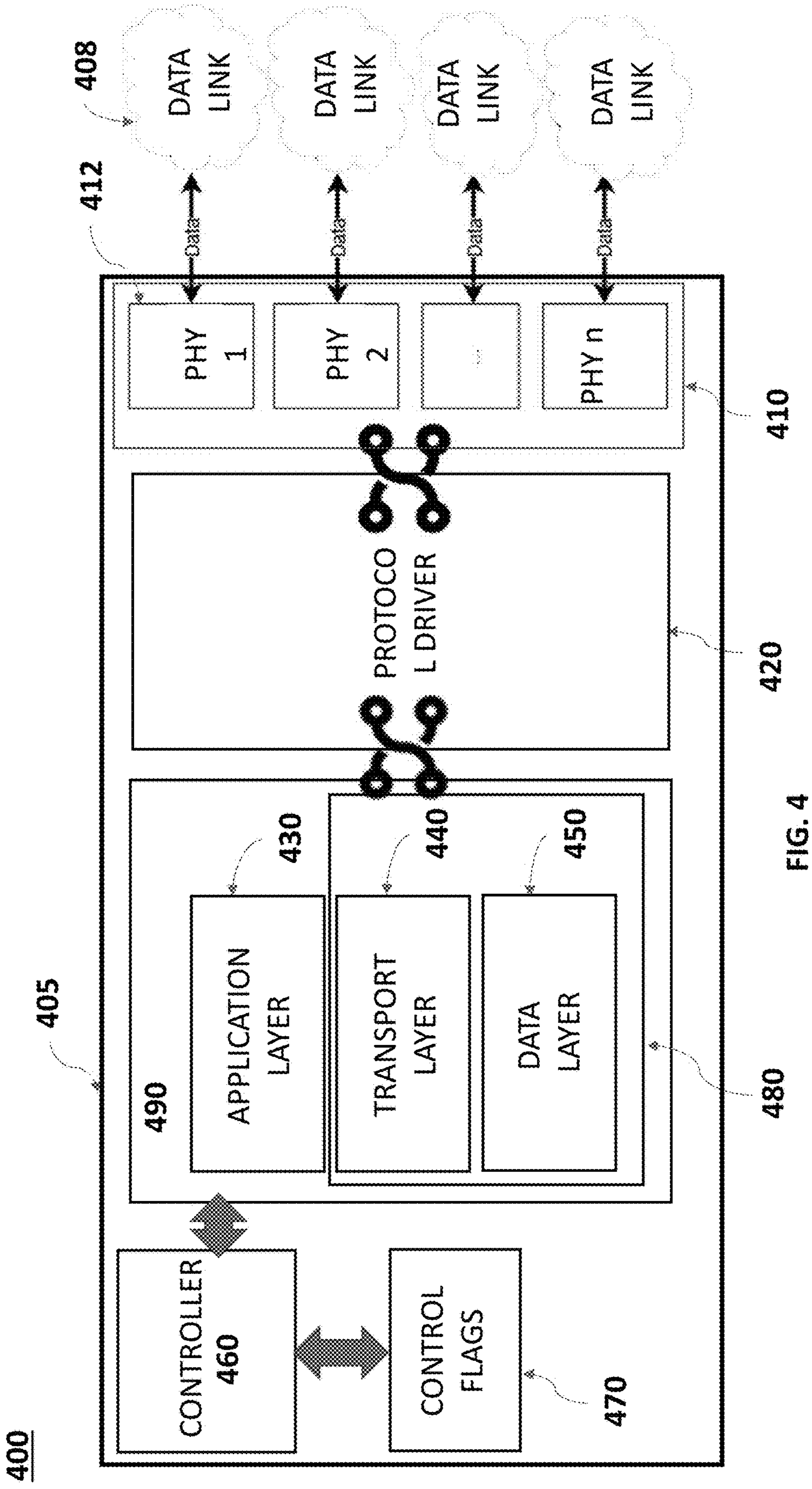
FIG. 4 illustrates an example block diagram of a smart routing system in accordance with some embodiments.

Each DSDN node (262, 264, 266, 268, and 270) can include a controller (215, e.g., detailed description is shown in FIG. 4). The controller 215 can implement the smart routing system. For example, the controller 215 can manage the control plane of each DSDN node network architecture, where the control and data planes are logically separated. In the DSDN node network architecture, the control plane generally includes one or more control plane components distributed across and implemented by one or more control servers. The control plane components are typically implemented on separate servers and may be responsible for network configuration rules. While the data plane represents the movement of user data through the distributed computing system, the control plane can represent the movement of control signals through the distributed computing system. The controller 215 can store configuration rules and/or define a standard IP data protocol to be used to communicate data with the other DSDN nodes. The controller can also determine whether the data protocol of the received data is the standard IP data protocol in response to determining that the data protocol of the received data is not the standard IP data protocol and/or convert the data protocol to the standard IP data protocol.

In various embodiments, the DSDN configuration (200B) can be compatible with disparate networks. More specifically, in some embodiments, the controller 215 can implement the modular network system (205). For example, the controller 215, by implementing the modular network system (205), can establish a common wireless communication path between the DSDN nodes such that the communication paths (284, 286, 288, 290, 292, 294, and 296) can be the common wireless communication path configured with a certain type of data link protocol (e.g., a standard IP). In these embodiments, a controller 215 (e.g., by implementing the modular network system (205)) within each DSDN node (262, 264, 266, 268, and 270) can convert a variety of data formats into a standard IP protocol. Thus, any data format within a DSDN sub-network (252, 254, 256, 258, or 260)

can be first converted into a standard IP data format. Then, the controller 215 can transmit the data with a standard IP data format to another or other DSDN nodes using communication paths. For example, suppose the DSDN sub-network (254) is using a SATCOM datalink. In that case, the controller 215 in the DSDN node 2 (264) can convert the SATCOM data format into the standard IP format and transmit the converted data to DSDN node 5 (270) via a communication path (296), where the DSDN sub-network (260) may also use a different data link such as an RF data link. Thus, even though the DSDN sub-networks (254, 260) use different data links, the DSDN sub-networks (254, 260) can communicate data with each other via the communication path (296).

In various embodiments, the DSDN configuration (200B) can be easily adapted to changing network conditions, such as network interruptions and network system fluctuations. For example, even if a communication path (284) is deactivated, the DSDN node 2 (264) and the DSDN node 3 (266) can still be connected to each other through other communication paths (282 and 286) and the DSDN node 1 (262). Further, even if the communication path (286) is also deactivated, the DSDN node 2 (264) and the DSDN node 3 (266) can still be connected through other communication paths (282, 288, 290, 294, and/or 296) and DSDN node 1 (262), DSDN node 4 (268), and/or DSDN node 5 (270). Each DSDN node can automatically determine an optimized communication path. The controller in the DSDN node may optimally route data across the DSDN to a DSDN destination DSDN node based on one or more factors of path cost, bandwidth, latency, link aggregation, redundancy, etc., where the controller monitors the factors in real-time. In some embodiments, the DSDN nodes can be dynamically grouped or ungrouped based on the factors or network conditions.

In various embodiments, at least one of the DSDN sub-networks (252, 254, 256, 258, or 260) may include a SUBDSDN (275). For example, as shown in FIG. 2B, the DSDN sub-network (258) includes a SUBDSDN (275). The SUBDSDN (275) can be connected to other DSDN nodes, e.g., to the DSDN node 3 (266) via the communication path (288) or the DSDN node 5 (270) via the communication path (292). The SUBDSDN (275) can be a local physical group system that directly connected to a DSDN node. For example, if an airplane is a DSDN node and connected to a DSDN, internal computers inside the airplane, where the internal computers are physically connected to each other, can be the SUBDSDN (275).

Overview of Smart Routing System

Figure 3:
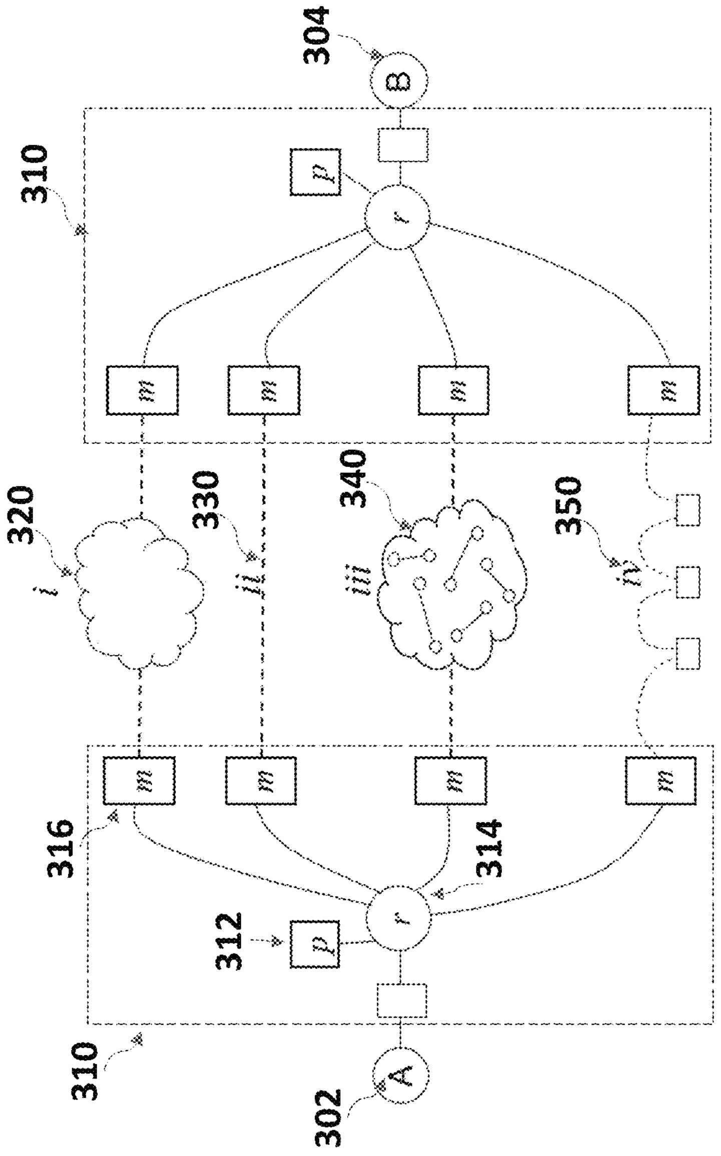
FIG. 3 shows an example of smart routing system in various types of networks in accordance with some embodiments.

FIG. 3 shows an example of smart routing in various types of networks in accordance with some embodiments. As shown in FIG. 3, the source network device (302) and the destination network device (304) are communicatively coupled in various networks (320, 330, 340, and 350). In some embodiments, the source and destination network devices (302, 304) include the smart routing system (310). In other embodiments, the source and destination network devices (302, 304) are connected to respective network devices that include the smart routing system (310). For example, referring to FIG. 2B, the smart routing system is included in their associated DSDN nodes (for example, in the controller 215 of the DSDN nodes (262, 264, 266, 268, and 270).

As shown in FIG. 3, the smart routing system (310) can include a processor (312), a router (314), and modems (316). The processor (312) can compute logic to make a routing decision or switch data paths based on congestion or latency, such as by monitoring air-time and location of the source and destination network devices (302, 304). In some embodiments, the processor (312) is a discrete processor dedicated to the smart routing system (310). The router (314) includes a dedicated interface that is directly connected to the processor (312). Since the processor (312) is dedicated to determining the routing decision, the processor (312) can utilize its full computing resources to make the routing decision, thus, the routing decision can be made more securely and with minimum computing latencies. In some embodiments, the router (314) can be implemented as an internal module of the processor (312).

As shown in FIG. 3, the smart routing system (310) can further be configured to route data using various data link formats. For example, the smart routing system (310) includes various modems (316). Each modem (316) can be configured to generate data link format dedicated to specific network configurations (320, 330, 340, and 350). In some embodiments, the network configuration (320) can be the DSDN, as described in FIG. 2B. In some embodiments, the network configuration (330) can be a direct connection. In some embodiments, the network configuration (340) can be a network that includes a plurality of switches. The network configuration (350) can support the routing based on hopping.

Hardware Architecture of Smart Routing System

FIG. 4 illustrates an example of a block diagram of a smart routing system in accordance with some embodiments. In some embodiments, the controller (215) illustrated in FIG. 2B can implement the smart routing system (400). The smart routing system (400) shown in FIG. 4 is merely an example network, and certain elements may be modified or removed, two or more elements combined into a single element, and/or other elements or equipment may be added. The smart routing system (400) may include a physical layer (410), a protocol driver (420), an application layer (430), a transport layer (440), a data layer (450), a controller (460), and control flags (470). In some embodiments, the physical layer (410), the protocol driver (420), the application layer (430), the transport layer (440), and a data layer (450) are integrated as a network system layer (405).

In some embodiments, the control flags (470) are embedded in the network traffic headers and are extracted by the controller (460). In these embodiments, the application layer (430), the transport layer (440), and the data layer (450) can be the DSDN nodes' operating network functions and stacks that are modified by the controller's instructions.

In some embodiments, the application layer (430), the transport layer (440), and a data layer (450) can be an operating network (490). The operating network (490) can be modified by the controller. For example, the application layer (430) could be an application on a DSDN node that buffers information stored in storage to avoid interruptions, causing a loss of data. The data layer (450) can update routing information in the DSDN node to reconfigure its network connection with other DSDN nodes such as by creating a new optimal path. In some embodiments, the transport layer (440) and the data layer (450) can be formed as an operating system. The application layer (430) may include an application programming interface (API) that can communicate with a software program such as kill chains, storage management, firewall, compression, file server, video streaming, web browsing, encryption libraries, virtual private networks, etc. These programs are merely examples, and the present disclosure is not limited thereto, and the programs can be determined based on a particular application. The controller (460) can communicate with the operating system and the application layer (430). For example, the controller (460) may receive a reconfiguration request from the operating system or the application layer (430) to reconfigure the network. Then, the controller (460) can reconfigure the network based on the request. After the reconfiguration, the controller (460) can send the reconfiguration information to the operating system or the application layer (430). In some embodiments, the controller (460) can share data within the network, where the data can be received from the application layer (430). For example, the application layer (430) may send a new encryption key to the controller (460), and the controller (460) can update the network configuration with the new encryption key.

The physical layer (410) defines a data transmission medium. In some embodiments, the physical layer (410) can include one or more physical interfaces (412) to receive or transmit data using a data link (408) from one or more devices. In some embodiments, each physical interface (412) can support different types of data link (408). For example, one physical interface can receive a SATCOM data link, and another can receive a Link-16 data link. The number of physical interfaces (412) and data link types can be determined based on a specific application.

The protocol driver (420) can convert data received from the physical layer (410) (e.g., physical interface(s) included in the physical layer (410)) into a data format suitable for the network. For example, if the physical layer (410) receives, via the data link (408), one or more data having various formats such as serial, Fibre, Channel, or asynchronous transfer mode (ATM), the protocol driver (420) can convert the data format into a data format that can be used in the operating system (480). These various formats are merely examples, and the present disclosure is not limited thereto.

The application layer (430) can support various protocols. The protocols may include, but are not limited to, software-defined network (SDN), VLANs, Kill Chains, Storage, and Firewall. These protocols are merely examples, and the present disclosure is not limited thereto, and the protocols can be determined based on a particular application. In some embodiments, the application layer (430) can be specified based on the internet protocol under TCP/IP model.

The transport layer (440) may be responsible for data delivery within the DSDN. The transport layer (440) can establish a connection between two DSDN sub-networks. In some embodiments, the transport layer (440) securely delivers the data by adding one or more VPN, proxy, or Authentication protocols. These protocols are merely examples, and the present disclosure is not limited thereto, and the protocols can be determined based on a particular application.

The data/network layer (450) may deliver data to a specific destination DSDN node. The data layer (450) can convert various data formats into a standard IP format using packet parsing, data translation, or encapsulation methods.

The controller (460) can manage the smart routing system (400). In some embodiments, the controller (460) is implemented into each DSDN node. In each DSDN node, the controller (460) may manage the application layer (430), the transport layer (440), and the data/network layer (450). In some embodiments, the controller (460) uses the configuration rules stored in a control layer. In some embodiments, the controller (460) can include a routing decision engine. In these embodiments, using the configuration rules, the controller (460) can determine a communication path between two DSDN nodes using the routing decision engine.

The control flags (470) can configure the network by communicating data within the network. In some embodiments, the control flags (470) can be used to indicate a DSDN node's type (controller or just plain data transport), a DSDN node's authentication/security level, heartbeat information, timestamps, etc., for controllers to share status type information directly. The control flags (470) may communicate data with the controller (460) to configure the network. For example, the control flags (470) can include the DSDN nodes' information and can provide the information to one or more DSDN nodes. The DSDN node information may include the DSDN nodes' type (such as whether the DSDN node is a controller or data transporter), authentication or security level, heartbeat information, timestamps, etc. These DSDN nodes' information is merely examples, and the present disclosure is not limited thereto.

In some embodiments, the controller (460) can define a standard IP data protocol to be used to communicate data with the other DSDN nodes. The controller (460) can also determine whether the data protocol of the received data is the standard IP data protocol in response to determining that the data protocol of the received data is not the standard IP data protocol and convert the data protocol to the standard IP data protocol.

In some embodiments, the controller can receive data in various formats and convert into the standard IP. For example, the smart routing system (400) receives data from various sensors that are communicatively coupled with the smart routing system (400) of the DSDN node. For example, if the DSDN node is an Airborne Warning and Control System (AWACS) airplane, the sensors included in the AWACS are communicatively coupled with the smart routing system (400). In this example, the smart routing system (400) can receive various data generated from each sensor, and the system layer (405) can convert these various data into the standard IP.

Hardware Architecture of Modular Network System

Figure 5:
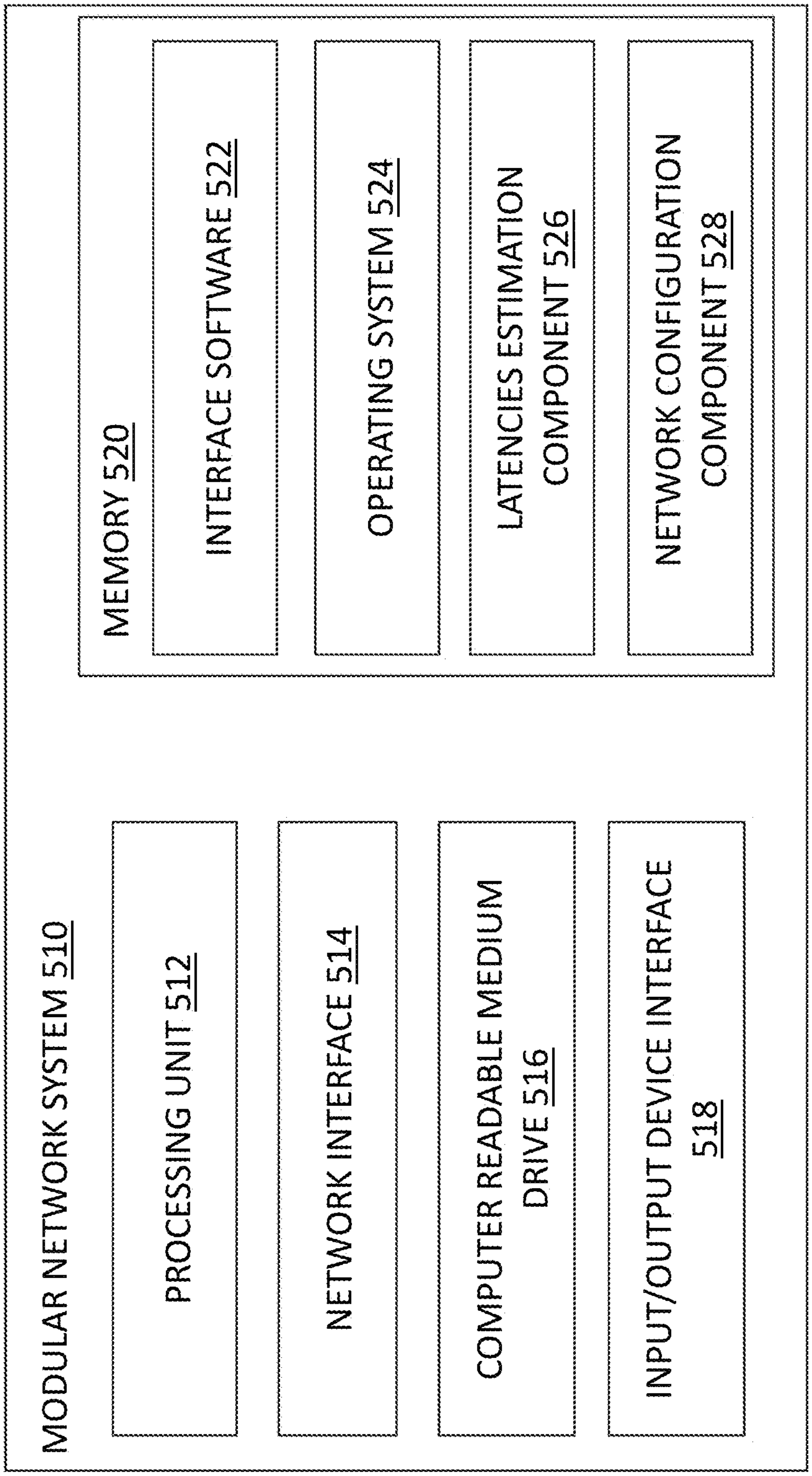
FIG. 5 illustrates an example block diagram of a modular network system in accordance with some embodiments.

FIG. 5 illustrates an example block diagram of a modular network system (510). This modular network system (510) can be the same or similar to the modular network system (205) illustrated in FIG. 2A. For the purpose of convenience and brevity, the modular network system (510) is described as a standalone component. However, the modular network system (510) can be implemented in a DSDN node (e.g., device, networking device, etc.). In some embodiments, the controller (215) (see FIG. 2B) can implement the modular network system (510), or, alternatively, the modular network system (510) can be implemented as a standalone component. The present disclosure does not limit the implementation of the controller (215) and the modular network system (510).

In some embodiments, the modular network system (510) can convert data packets in various data link formats into a common data standard, such as an IP. The modular network system (510) can also form a common network path (250) and be communicatively coupled with other DSDN nodes that include the modular network system (510) via the common network path (250). For example, the modular network system (510) receives data packets in the form of a dedicated data link standard and convert the received data packets into IP. The modular network system (510) may transmit the converted data via the common network path (250). In some embodiments, the common network path (250) is a virtual network path, thus, the modular network system (510) may transmit the converted data packets by further designating its source and destination IP addresses.

The general architecture of the modular network system (510) depicted in FIG. 5 includes an arrangement of computer hardware and software components that may be used to implement aspects of the present disclosure. As illustrated, the modular network system (510) can include a processing unit (512), a network interface (514), a computer-readable medium drive (516), and an input/output device interface (518), all of which may communicate with one another by way of a communication bus. These components can be implemented as software, hardware, or a combination thereof. These components can be implemented as dedicated components or as integrated components of the DSDN node. The present disclosure does not limit the way of implementation.

The processing unit (512) may process one or more instructions generated from the memory (520). The network interface (514) can provide one or more physical interfaces for receiving or transmitting data packets from various devices. In some embodiments, the network interface (514) supports different types of data links. For instance, one physical interface could receive a satellite communication (SATCOM) data link while another receives a Link 16 data link. These data types can include but are not limited to, conventional military or commercial data links. The number of physical interfaces and data link types can be determined based on the specific application.

The computer readable medium drive (516) can store data or databases used for generating instructions from the memory (520). For example, it can store multiple IP addresses associated with devices and DSDN nodes. It can also include configuration rules, such as an authentication scheme for joining a network, which can be based on the deployment use case, such as pre-shared key encryption, public key infrastructure handshaking, or no authentication at all. In some embodiments, permission to join the network may include trust levels and priorities that can distribute or accept configurations.

The computer readable medium drive (516) may also include criteria used for monitoring the congestion of each DSDN node. These criteria can vary for each DSDN node based on its available network resources and can be defined by a user (e.g., network administrator, network manager, developer, etc.).

The modular network system (510) may further include an input/output device interface (518), which provides output from the processing unit (512) to the DSDN node that includes the modular network system (510). For instance, after receiving data packets from another DSDN node via the common network path (250), the modular network system (205) may process the received data packets and provide them to the DSDN node.

For example, referring back to FIG. 2A, when the modular network system (205) of DSDN node (282) receives data packets from DSDN node (262), it may process the received data packets to identify data included in its payloads. The modular network system (205) of DSDN node (282) may utilize its input/output device interface (518) to transmit the data to DSDN node (282). In another example, if the DSDN node (282) needs to transmit data to another DSDN node (262), it may provide the data to the modular network system (205) of DSDN node (282) via the input/output device interface (518) of the modular network system (205).

The memory (520) may include computer program instructions that the processing unit (512) executes in order to implement one or more embodiments. The memory (520) includes RAM, ROM, or other persistent or non-transitory memory. The memory (520) may store an operating system (524) that provides computer program instructions for use by the processing unit (512) in the general administration and operation of the modular network system (205). The memory (520) may further include computer program instructions and other information for implementing one or more aspects of the present disclosure. For example, in one embodiment, the memory (520) includes interface software (522) for communicating with other components and performing network configuration, data packet receipt or transmission, etc.

The memory (520) can include a latency estimation component (526), which can determine communication latencies between different DSDN nodes. In some embodiments, the communication latency can vary for each DSDN node. For instance, referring to FIG. 2A, the communication latency between DSDN node (242) and DSDN node (222) may be greater than that between DSDN node (242) and DSDN node (232). In certain scenarios, the latency estimation component (526) may periodically measure these latencies. For example, when a DSDN node like a DSDN node (222) is continuously moving, the latency can change dynamically. As such, the latency estimation component (526) measures the latency on a regular basis to keep up with these changes.

The memory (520) may further include the network configuration component (528). In some embodiments, the network configuration component (528) may translate data in various disparate forms into a common format. For example, when the network interface (514) receives, via the data link of the DSDN node, one or more data having various formats such as serial, Fibre, Channel, or asynchronous transfer mode (ATM), the network configuration component (528) can convert the data format into a common data standard. This common data standard can be used in the operating system (524). These various formats are merely examples, and the present disclosure is not limited thereto.

In some embodiments, the network configuration component (528) may establish a common network path 250. The common network path 250 can be a virtual network path. This virtual network path may dynamically adapt various protocols, such as software-defined network (SDN), VLANs, Kill Chains, Storage, and Firewall. Furthermore, the network configuration component (528) may configure this virtual network by assigning one or more virtual private network addresses, proxies, or authentication protocols. These protocols are merely examples, and the present disclosure is not limited thereto, and the protocols can be determined based on a particular application.

In some embodiments, the network configuration component (528) can convert various data formats into a standard IP format using packet parsing, data translation, or encapsulation methods. These methods are included in U.S. Pat. No. 11,496,396, titled "DISTRIBUTED SOFTWARE-DEFINED NETWORK," which is hereby incorporated by reference in its entirety.

In some embodiments, the network configuration component (528) may monitor the congestion of each DSDN node and manage the congestion rate based on the estimated latencies measured by the latency estimation component (526). For instance, referring to FIG. 2A, if the modular network system (205) of DSDN node (242) estimates a 2-second latency when receiving data packets from DSDN node (232), it may assess its current congestion rate. In response to the current congestion rate being found to be below its threshold, the modular network system (205) of DSDN node (232) may request the congestion rates of other DSDN nodes. In response to the modular network system (205) of DSDN node (222) determining its congestion rate to be lower, it may transmit a message indicating its available congestion capacity. Consequently, the modular network system (205) of DSDN node (232) may request DSDN node (232) to direct the data packets to DSDN node (222). Once DSDN node (222) receives the complete set of data packets from DSDN node (232), it can then route these packets to DSDN node (242) via the common network path (250). This process allows for efficient data transmission even in situations where certain DSDN nodes are experiencing high levels of network congestion.

The network configuration component (528) may also implement the determined congestion in configuring the communication between DSDN nodes. In some embodiments, the network configuration component (528) may utilize the determined congestion rate as buffer. For example, if the determined congestion rate is 2 seconds when the DSDN node (222) is transmitting data to the DSDN node (232), the network configuration component (528) included in the modular network system (205) of the DSDN node (232) may have a buffering time of 2 seconds. Thus, the DSDN node (232) can receive the full data packets from the DSDN node (222) without losing data packets due to the communication latency of 2 seconds, in this example.

Method of Data Format Conversion into Common Standard Format

Figure 6A:
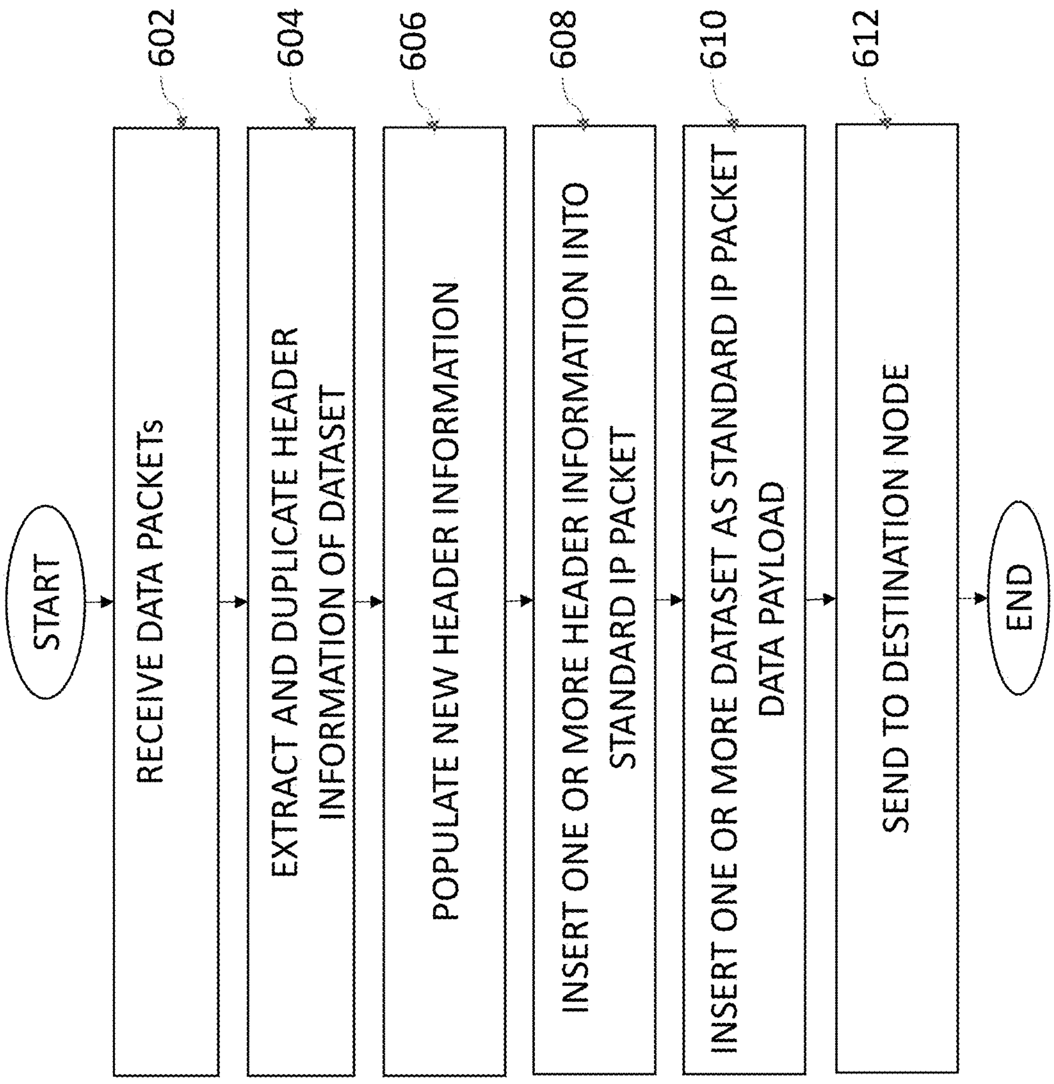
FIG. 6A is an example process flow diagram of a method of translating and encapsulating data according to some embodiments.
Figure 6B:
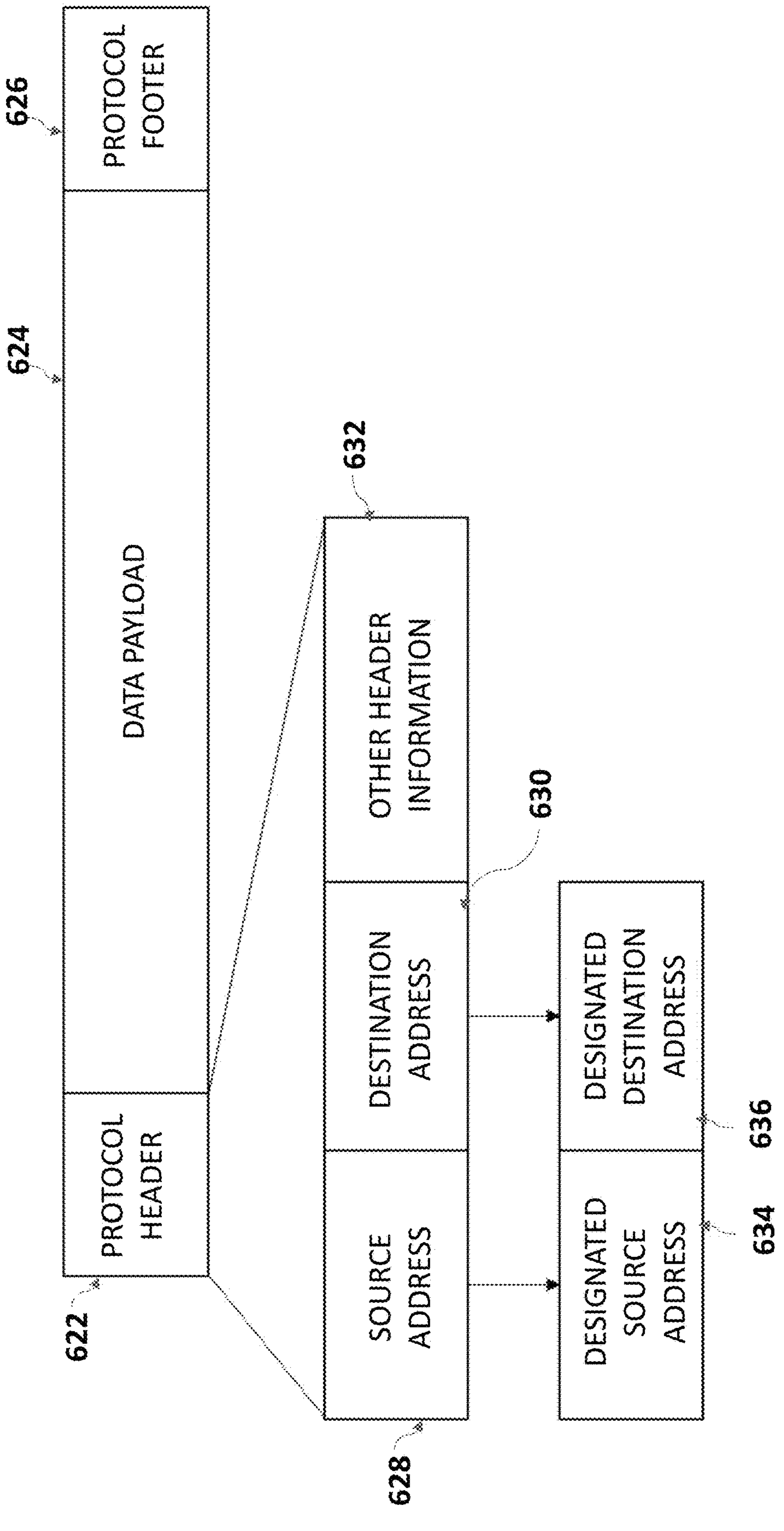
FIGS. 6B-6D show data format conversion examples processed by a smart routing system according to some embodiments.
Figure 6C:
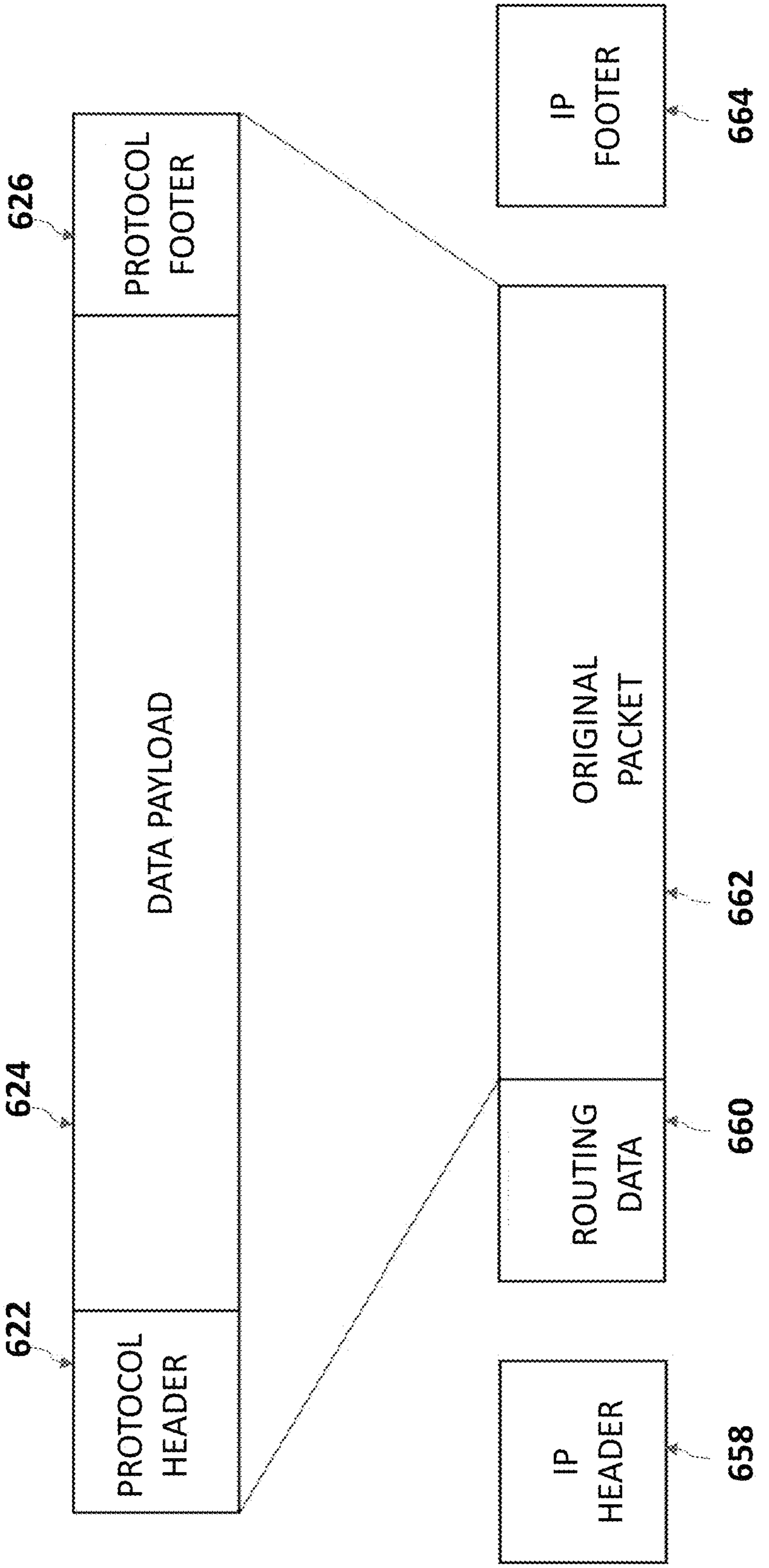
Figure 6D:
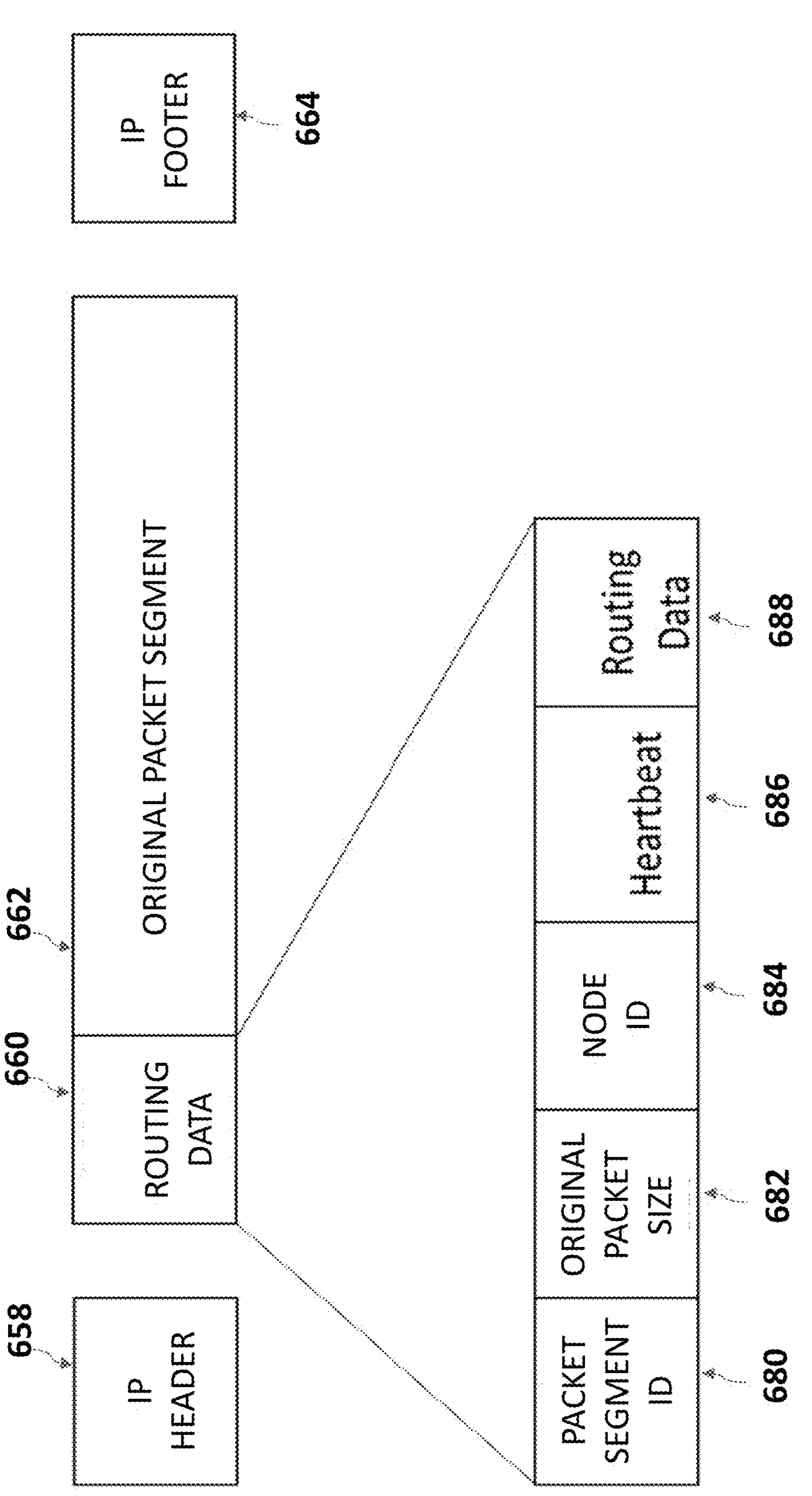

FIG. 6A is an example process flow diagram 600 of a method of converting data into a common standard format, such as an IP format, by translating and encapsulating data according to some embodiments. FIG. 6A is merely an example process flow diagram for data processing within each DSDN node. For the purpose of convenience and brevity, the present disclosure discloses that the controller (215) performs the process flow as illustrated in the example process flow diagram (600). However, the modular network system (205) of FIG. 2A or the modular network system (510) of FIG. 5 can also perform the process, as illustrated in the process flow diagram 600. In addition, the method can be modified based on application and specific data link types. For example, certain states may be removed, other states added, two or more states combined, or one state can be separated into multiple states depending on the specifications and requirements. FIGS. 6B-6D show data format conversion examples processed by the controller (215) according to some embodiments. FIGS. 6B-6D are examples of a data format corresponding to a specific state of FIG. 6A. FIGS. 6B-6D are merely example data formats, and the present disclosure is not limited thereto. For the purpose of convenience, the description will be made based on the controller (215) performing or causing at least part of the process flow diagram 600 of FIG. 6A by referring to FIGS. 2B, 4 and 6B-6D.

In state (602), the controller (215) can receive or cause a DSDN node to receive data packets or dataset from devices in another network DSDN node. For example, as shown in FIG. 2A, the DSDN node 2 (264) receives data from devices connected to the DSDN node 2 (264) in the sub-network (254). In some scenarios, the DSDN node 2 (264) can be the Airborne Warning and Control System (AWACS), and the devices in the sub-network (260) are various sensors implemented in the AWACS. Thus, the controller (215) of the AWACS can form the sub-network 254 with these various sensors (e.g., the devices) and receive the data packets from these various sensors.

In state (604), the controller (215) can extract and duplicate header information of the dataset. For example, the controller (215) can convert the various data formats into a common data standard. For example, as shown in FIG. 6B, the data packets can be extracted and duplicated into a data format comprising a protocol header (622), a data packet (624), and a protocol footer (626).

In state (606), the controller (215) may populate the protocol header (622) information in a newly created header. As shown in FIG. 6B, for example, the new protocol header may include a source address (628), a destination address (630), and other header information (632). In some embodiments, the source address (628) can be a designated source address (634), and the destination address (630) can be a designated destination address (636).

In state (608), the controller (215) can insert one or more header information into a standard IP packet. For example, the designated source address (634) and the designated destination address (636) may be inserted into a standard IP based packet. Illustratively, as shown in FIG. 6C, once the designated source address (634) and the designated destination address (636) are inserted into an IP header (658), the new data format may include an IP header (658), a routing data (660), an original packet (662), and an IP footer (664).

In state (610), the controller (215) can insert one or more data packets or datasets as a data payload. For example, as shown in FIG. 6C, the dataset's protocol header (622), the data packet (624), and the protocol footer (626) can be inserted into an original packet (662).

In some embodiments, as shown in FIG. 6D, the routing data (660) can include one or more fields, for example, for a packet segment identification (680), an original packet size (682), a DSDN node ID (684), a heartbeat (686), and a routing data (688). In some examples, the packet segment ID (680), the original packet size (682), the DSDN node ID (684), the heartbeat (686), and the routing data (688) can be received from the controller (215).

In state (612), the controller (215) can send the data to the destination DSDN node in accordance with routing rule defined in the routing data 660. In some embodiments, the data can be sent across the network path with no additional processing necessary until it returns to the destination end device. At this point, the process may be reversed, and the original packet may be presented to the existing physical interface of the end device.

Figure 7:
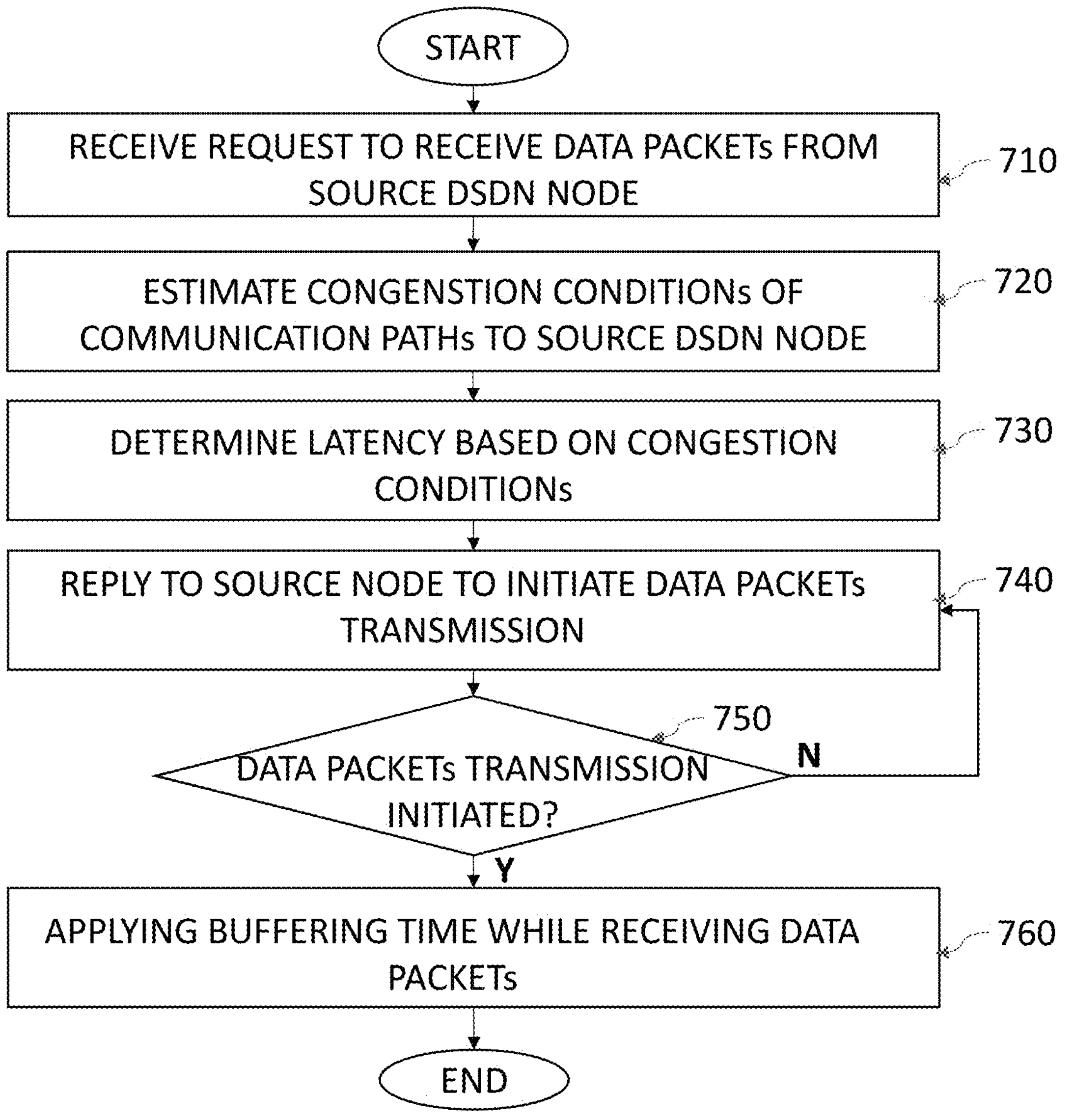
FIG. 7 is an example process flow diagram of a method of data communication that estimates congestion conditions of network communication paths.

Method of Data Communication Between DSDN Nodes by Analyzing Communication Paths Congestion Condition FIG. 7 is an example process flow diagram (700) of a method of data communication that estimates congestion conditions of network communication paths. The transmission DSDN node can be one of a plurality of DSDN nodes included in a network, such as the DSDN configuration (200A) or (200B) shown in FIGS. 2A and 2B. The process flow diagram (700) may be implemented by the modular network system (205) of FIG. 2A (or the modular network system (510) of FIG. 5) and/or the controller (215) in accordance with embodiments disclosed herein. More specifically, the modular network system (205) or the controller (215) (e.g., implemented in a destination DSDN node) may perform the processes of the flow diagram (700) when receiving data packets from a transmission DSDN node. FIG. 7 is merely an example process flow diagram for data processing within each DSDN node that includes the modular network system (205) and/or the controller (215), and the method can be modified based on application and specific data link types. For example, certain states may be removed, other states added, two or more states combined, or one state can be separated into multiple states depending on the specification and requirements. For the purpose of convenience, the description will be made based on the modular network system (205) performing or causing at least part of the process flow diagram 700.

In state (710), a DSDN node (e.g., a designated DSDN destination node) can receive a request to receive data packets from another DSDN node (e.g., a designated DSDN source node). For example, as shown in FIG. 2A, the modular network system (205) of the DSDN node (212) receives a request to transmit data packets from the DSDN node (222). The request can indicate that the DSDN node (222) (e.g., a source DSDN node) will send the data to the DSDN node (212) (e.g., a destination DSDN node). The request can be made by sending an initial data packet that identifies the types of data, source of the data, source DSDN node, and/or destination DSDN node.

In state (720), the modular network system (205) of the DSDN node that has received the request (e.g., the DSDN node (212)) can estimate congestion conditions of communication paths to source DSDN node (e.g., the DSDN node that sent the request). For example, these congestion conditions can be referred to as latency between DSDN nodes (e.g., between a source DSDN node (e.g., DSDN node (222)) and a destination DSDN node (e.g., DSDN node (212)). The latency may also include communication latency and/or system processing latency. For example, when DSDN node (212) has received the request from the DSDN node (222), the modular network system (205) of DSDN node (212) may estimate the congestion condition between DSDN node (212) (e.g., destination DSDN node) and DSDN node (222) (e.g., source DSDN node). In some embodiments, the modular network system (205) of the DSDN node (212) may estimate the congestion condition by monitoring network communication latency, resources (such as bandwidth, capacity, etc.), and the utilization ratio of the communication path.

In state (730), the modular network system (205), such as the modular network system (205) of the DSDN node (212) (e.g., the destination DSDN node) that received the request, may determine latency based on the congestion conditions. In some embodiments, the modular network system (205) of the DSDN node (212) can determine the latency by comparing the timestamp included in the data transmission request with the time when the request was received. For example, in response to DSDN node (212) (e.g., destination DSDN node) receiving the request, the modular network system (205) of DSDN node (212) (e.g., destination DSDN nose) identifies the time when the request was sent from the DSDN node (222). Then, the modular network system (205) of DSDN node (212) can compare the identified time with the time when DSDN node (212) received the request. This time difference may represent the latency between DSDN nodes (212) and (222). In some embodiments, the request sent from the transmission DSDN node (for example, DSDN node (222) in this case) can include a timestamp representing when the request was sent.

In state (740), the modular network system (205), such as the modular network system (205) of the DSDN node that received the request, may reply to the source DSDN node to initiate the data packets transmission. For example, the DSDN node (212) may send a reply message to the DSDN node (222) to initiate the data packets transmit. In some embodiments, this reply can include data packets authorizing the transmission of data packets.

In state (750), the modular network system (205), such as the modular network system (205) of the DSDN node that received the request, may determine whether data packet transmission has been initiated. For example, if the modular network system (205) of DSDN node (212) (e.g., the destination DSDN node (212)) determines that transmission has been initiated from the DSDN node (222) (e.g., the source DSDN node (222)), process (700) can proceed to state (760). However, if the modular network system (205) of the DSDN node (212) determines that transmission has not been initiated, process (700) may return to state (740). For example, when DSDN node (212) replied to DSDN node (222) to initiate data packet transmission, DSDN node (212) may wait for a pre-defined time duration. If the DSDN node (212) does not receive data packets after waiting for the pre-defined time duration, the process (700) may return to state (740) to resend the reply. In some cases, the pre-defined time duration can be determined based on the determined latency, such as twice the determined latency at state (730).

In state (760), the modular network system (205) that received data packets can apply buffering time while receiving data packets from the transmission DSDN node. In some embodiments, the buffering time can be determined based on the determined latency at state (730). For example, the buffering time can be same as the determined latency or two or more times than the determined latency. For example, when the DSDN node (212) is receiving data packets from DSDN node (222) via a communication path between DSDN nodes (212 and 222), the modular network system (205) of DSDN node (212) may determine and implement buffering time. For instance, if the determined latency indicates a latency of 2 seconds, then the modular network system (205) of the DSDN node (212) may wait for 4 seconds (e.g., buffering time defined as twice the latency) when receiving data packets from DSDN node (222). The buffering time can be determined based on specific applications, and the present disclosure does not limit the buffering time.

Examples of Routing Decision Making Process

Figure 8A:
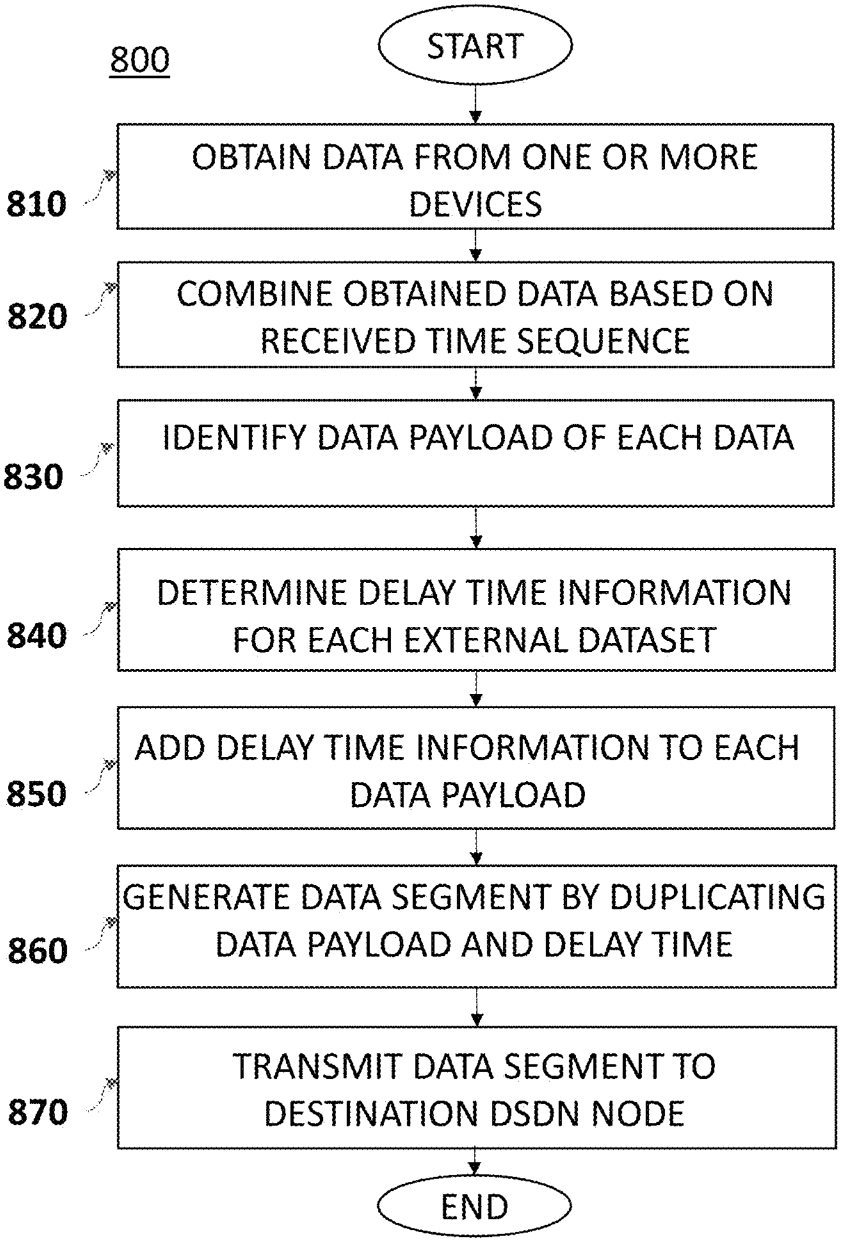
FIG. 8A illustrates an example process flow diagram of a routing decision making process implemented in an example of a smart routing system according to some embodiments.
Figure 8B:
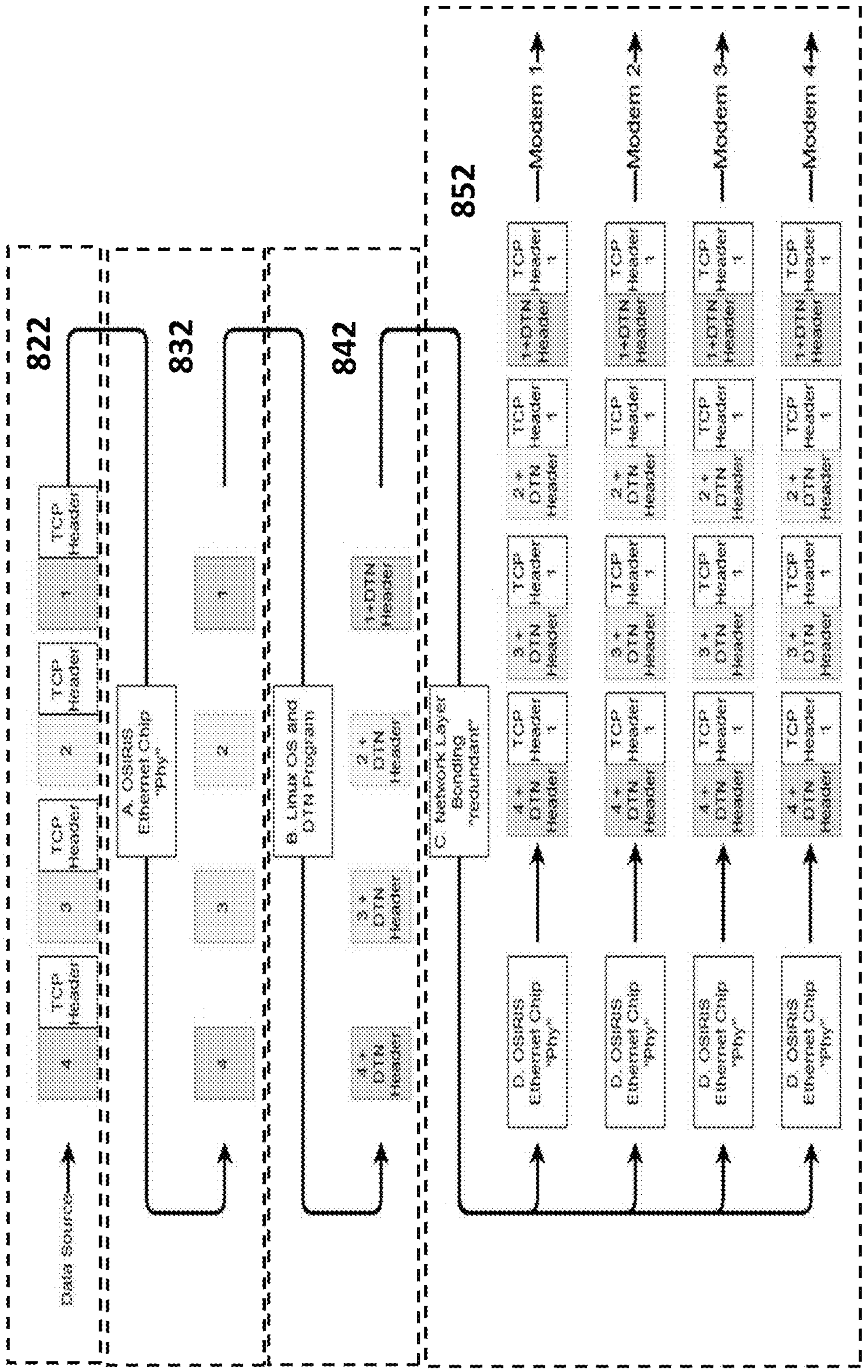
FIG. 8B is an example data flow diagram of the routing decision making according to the example illustrated in FIG. 8A.

FIG. 8A illustrates an example process flow diagram (800) of a routing decision making process implemented in an example of a smart routing system according to some embodiments. The process flow diagram (800) can be performed by a smart routing system (400) included in a controller (215) of a DSDN node (e.g., a source DSDN node). In some examples, the source DSDN node can be a DSDN node that received a dataset (e.g., external dataset) from one or more devices connected with the DSDN node. For example, as illustrated in FIGS. 6A-6D, the one or more devices transmit the dataset to the DSDN node with information of a data payload and a destination DSDN node information. Then, the controller (215) included in the DSDN node (e.g., source DSDN node) can identify the destination DSDN node based on the destination DSDN node information included in the dataset. FIG. 8B is an example data flow diagram of the routing decision making process flow diagram (800) according to the example illustrated in FIG. 8A. FIG. 8B is merely illustrated as an example without limiting the scope of the process (800). For example, the quantities and types of data payloads, headers, and routing devices (such as modems) are provided as illustrative examples without limitation. The specific numbers and types of data payloads, headers included in each payload, and routing devices can be determined based on the requirements of particular applications.

At step 810, a DSDN node (e.g., a source DSDN node) can receive a plurality of external datasets from one or more devices communicatively coupled with the source DSDN node. In some embodiments, the one or more devices are communicatively coupled with the source DSDN node outside of the DSDN. In these embodiments, the controller (215) of the source DSDN node can convert the external dataset format into a common data format used in the DSDN. The detailed description of the dataset format conversion is illustrated in FIGS. 6A-6D. In some embodiments, each external dataset includes at least a transmission control protocol (TCP) header and a data payload, and the TCP header includes at least a time stamp that indicates transmission time of the external dataset to the source DSDN node and destination DSDN node information. In other examples, the TCP header information of each external dataset can include source address, destination address, and other information, such as the time stamp. In some examples, the source DSDN node is an unmanned air vehicle that includes various sensors, and these sensors can be the devices, and the external dataset can be generated from these sensors. The present disclosure does not limit the type of data and devices.

At step 820, the source DSDN node can combine the obtained external dataset based on the received time sequence of each external dataset. In some embodiments, an application layer of the network system layer implemented in the smart routing system (400) may combine the received data packets. For instance, referring to step 822 of FIG. 8B, four distinct external datasets are received, each of which includes a TCP header and data payload (designated as 1, 2, 3, and 4). Additionally, these external datasets are combined based on their time sequence, arranging them from data 1 to data 4 according to their reception time, with data 1 being received first.

At step 830, the source DSDN node can identify data payload (e.g., as represented as 1, 2, 3, and 4) of each external dataset. For example, with reference to step 832 of FIG. 8B, the smart routing system (400) of the source DSDN node can identify the data payload of each data by removing the TCP header.

At step 840, the source DSDN node can determine delay time information for each external dataset. In some embodiments, the delay time information can be determined based on the time stamp included in the TCP header and the received time for each external dataset. For example, the delay time information can be determined by identifying the time difference between the time stamp of the TCP header and the received time at the source DSDN node for each external dataset.

At step 850, the source DSDN node can add the delay time information to each external data payload (e.g., as represented as 1, 2, 3, and 4) of the external datasets. In some embodiments, the delay time information can be added as a header of the data payload (e.g., as represented as 1, 2, 3, and 4), such as a delay tolerant network (DTN) header. For example, with reference to step 842 of FIG. 8B, each data payload (e.g., as represented as 1, 2, 3, and 4) includes the delayed time information by including the information as a DTN header. In some embodiments, the delay time information can be adjusted by adding a buffering time. For example, if the determined delay time is 2 seconds, the delay time can be adjusted by adding a buffering time. In some embodiments, the buffering time can be determined, as illustrated in state 760 in FIG. 7. In other embodiments, the buffering time can be determined based on specific applications or network congestion conditions, and the present disclosure does not limit the embodiments of determining the buffering time.

At step 860, the source DSDN node can generate a data segment by duplicating the data payload (e.g., as represented as 1, 2, 3, and 4) and the delay time for each external dataset. In some embodiments, each data segment can include the individual data payload (e.g., as represented as 1, 2, 3, or 4) with corresponding DTN header that includes the delay time for the individual data payload. In some embodiments, the number of duplication can be determined based on the number of available routing device, such as network modem, that each routing device connected to a destination DSDN node. For example, the number of duplications can be determined based on the number of destination DSDN nodes connected to a physical layer of the source DSDN node (e.g., controller (215) of the source DSDN node). For example, as illustrated in FIG. 8B (at 852 of FIG. 8B), when there are 4 destination DSDN nodes (e.g., identified from the TCP header of each external dataset), 4 modems are connected to the physical layer of the source DSDN node. In this example, the DSDN source node may generate 4 data segment by duplicating 4 times for each modem. Even though 4 data segments, duplications, and modems are described in this disclosure, the present disclosure does not limit the number of data segments, duplications, and modems.

At step 870, the DSDN source node can transmit the duplicated data payloads to the destination DSDN node (e.g., identified from the TCP header of each external dataset). In some embodiments, the destination DSDN node (s) is determined by processing the TCP header of each obtained data.

Figure 9A:
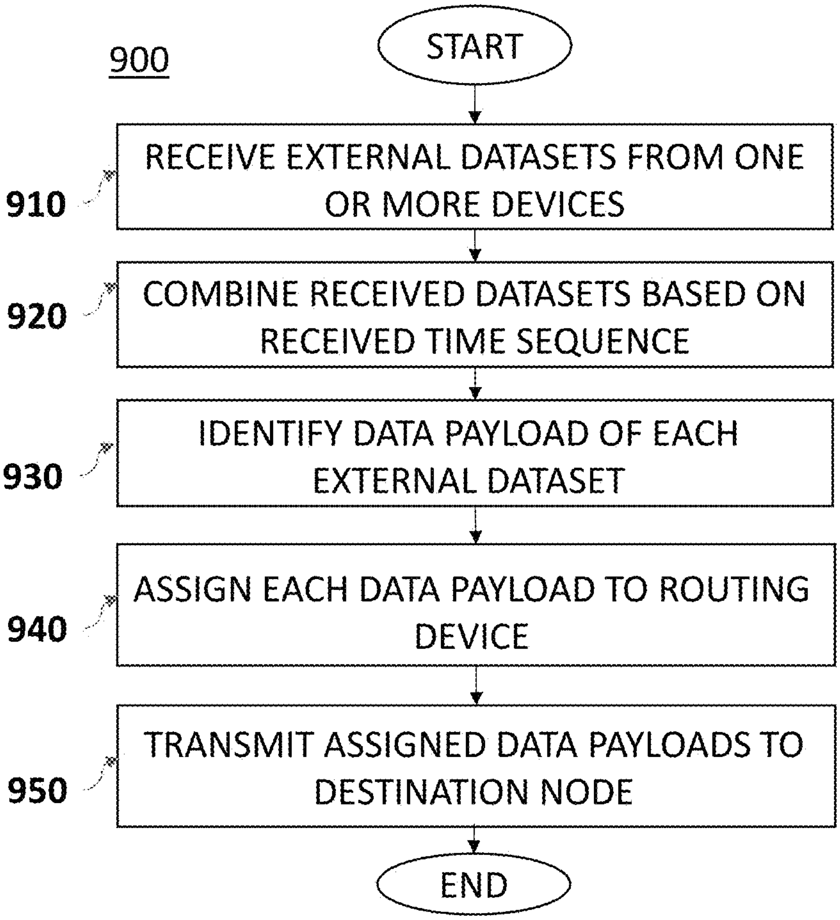
FIG. 9A illustrates another example routing decision making process implemented in an example of a smart routing system according to some embodiments.
Figure 9B:
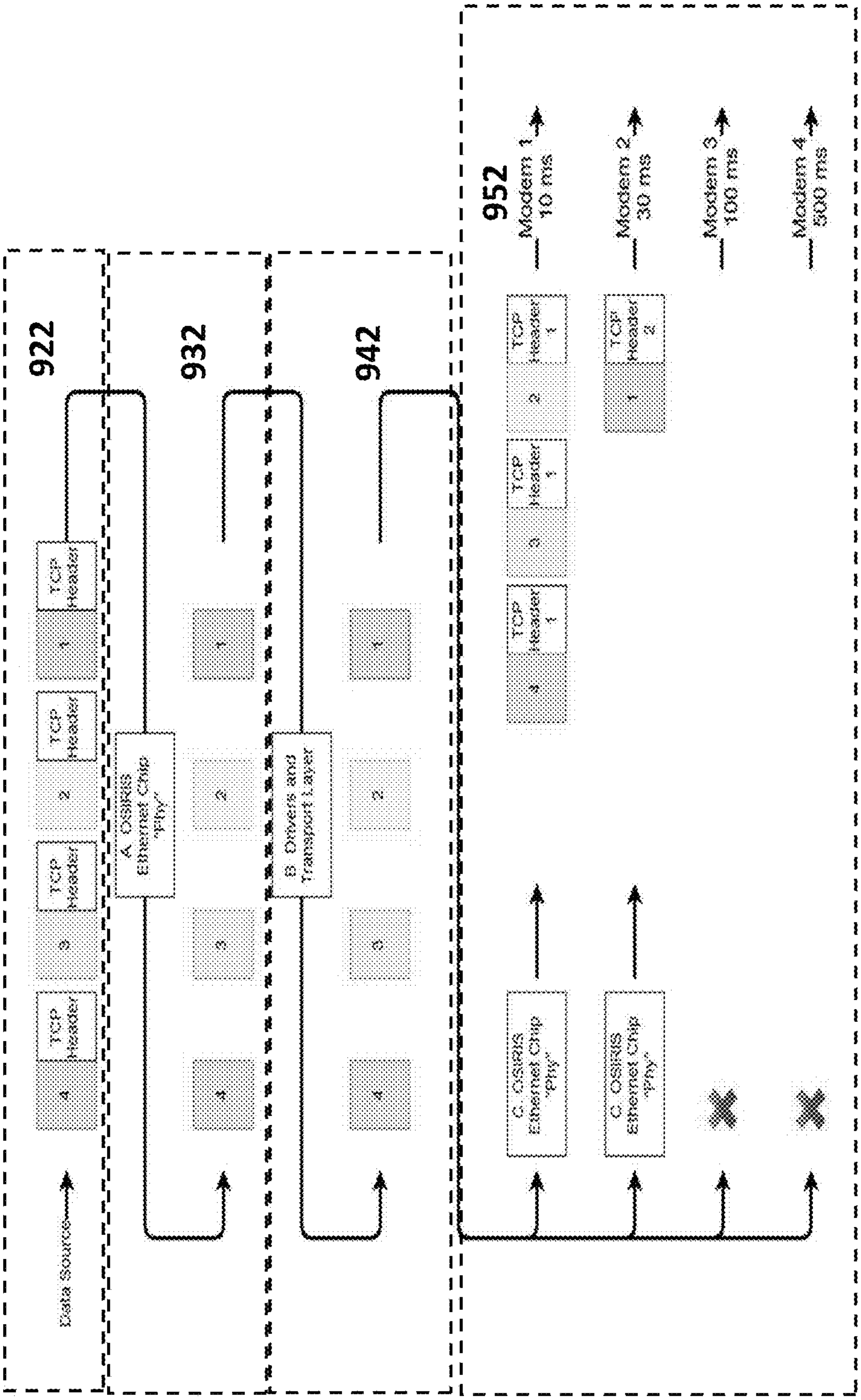
FIG. 9B is an example data flow diagram of the routing decision making according to the example illustrated in FIG. 9A.

FIG. 9A illustrates an example process flow diagram (900) of a routing decision making process according to some embodiments. The process flow diagram (900) can be performed by a smart routing system (400) included in a controller (215) of a DSDN node (e.g., a source DSDN node). FIG. 9B is an example data flow diagram of the routing decision making process according to the example illustrated in FIG. 9A. FIG. 9B is merely illustrated as an example without limiting the scope of the process (900). For example, the quantities and types of data payloads, headers, and routing devices (such as modems) are provided as illustrative examples without limitation. The specific numbers and types of data payloads, headers included in each payload, and routing devices can be determined based on the requirements of particular applications.

At step 910, a DSDN node (e.g., a source DSDN node) can receive a plurality of external datasets from one or more devices communicatively coupled with the source DSDN node. In some embodiments, the one or more devices are communicatively coupled with the source DSDN node outside of the DSDN. In these embodiments, the controller (215) of the source DSDN node can convert the external dataset format into a common data format used in the DSDN. The detailed description of the dataset format conversion is illustrated in FIGS. 6A-6D. In some embodiments, each external dataset includes at least a transmission control protocol (TCP) header and a data payload, and the TCP header includes at least a time stamp that indicates transmission time of the external dataset to the source DSDN node and destination DSDN node information. In other examples, the TCP header information of each external dataset can include source address, destination address, and other information, such as the time stamp. In some examples, the source DSDN node is an unmanned air vehicle that includes various sensors, and these sensors can be the devices, and the external dataset can be generated from these sensors. The present disclosure does not limit the type of data and devices.

At step 920, the source DSDN node can combine the obtained external dataset based on the received time sequence of each external dataset. In some embodiments, an application layer of the network system layer implemented in the smart routing system (400) may combine the received data packets. For instance, referring to step 922 of FIG. 9B, four distinct external datasets are received, each of which includes a TCP header and data payload (designated as 1, 2, 3, and 4). Additionally, these external datasets are combined based on their time sequence, arranging them from data 1 to data 4 according to their reception time, with data 1 being received first.

At step 930, the source DSDN node can identify data payload (e.g., as represented as 1, 2, 3, and 4) of each external dataset. For example, with reference to step 842 of FIG. 9B, the smart routing system (400) of the source DSDN node can identify the data payload of each data by removing the TCP header.

At step 940, the source DSDN node can assign each data payload (represented as 1, 2, 3, and 4) to a designated routing device, such as a modem. In some embodiments, this assignment is determined based on the delay time information (determined at step 940) for each data payload and the latency of each model. For example, as shown in step 952 of FIG. 9B, the modems 1, 2, 3, 4, can have 10 ms, 30 ms, 100 ms, and 500 ms of latency, respectively. In some embodiments, the source DSDN node distributes the data packets to the modems to minimize the total latency. For example, modem 1 can send 3 data packets within 30 ms. Then, the modem 2 can send one data packet within 30 ms. Thus, the total time delay transmitted from the source DSDN node can be 30 ms. The numbers of data payloads and modems are shown in FIG. 9B merely provided as an example. The present application does not limit these numbers of data payloads and modems.

At step 950, the source DSDN node can transmit the assigned data payloads to a destination DSDN node. In some embodiments, the destination DSDN node is determined by processing the TCP header of each obtained data.

Figure 10A:
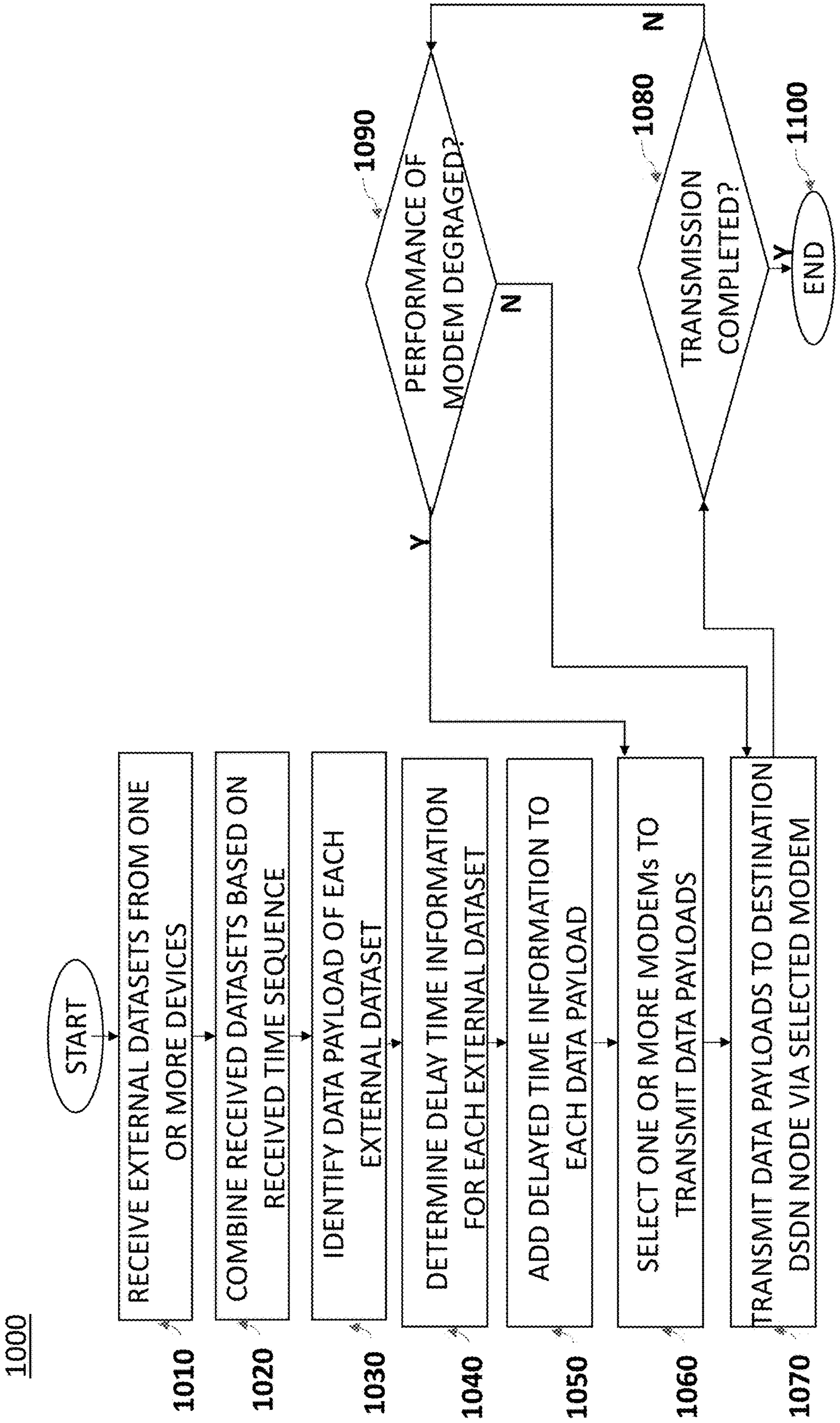
FIG. 10A illustrates another example routing decision making process implemented in an example of a smart routing system according to some embodiments.
Figure 10B:
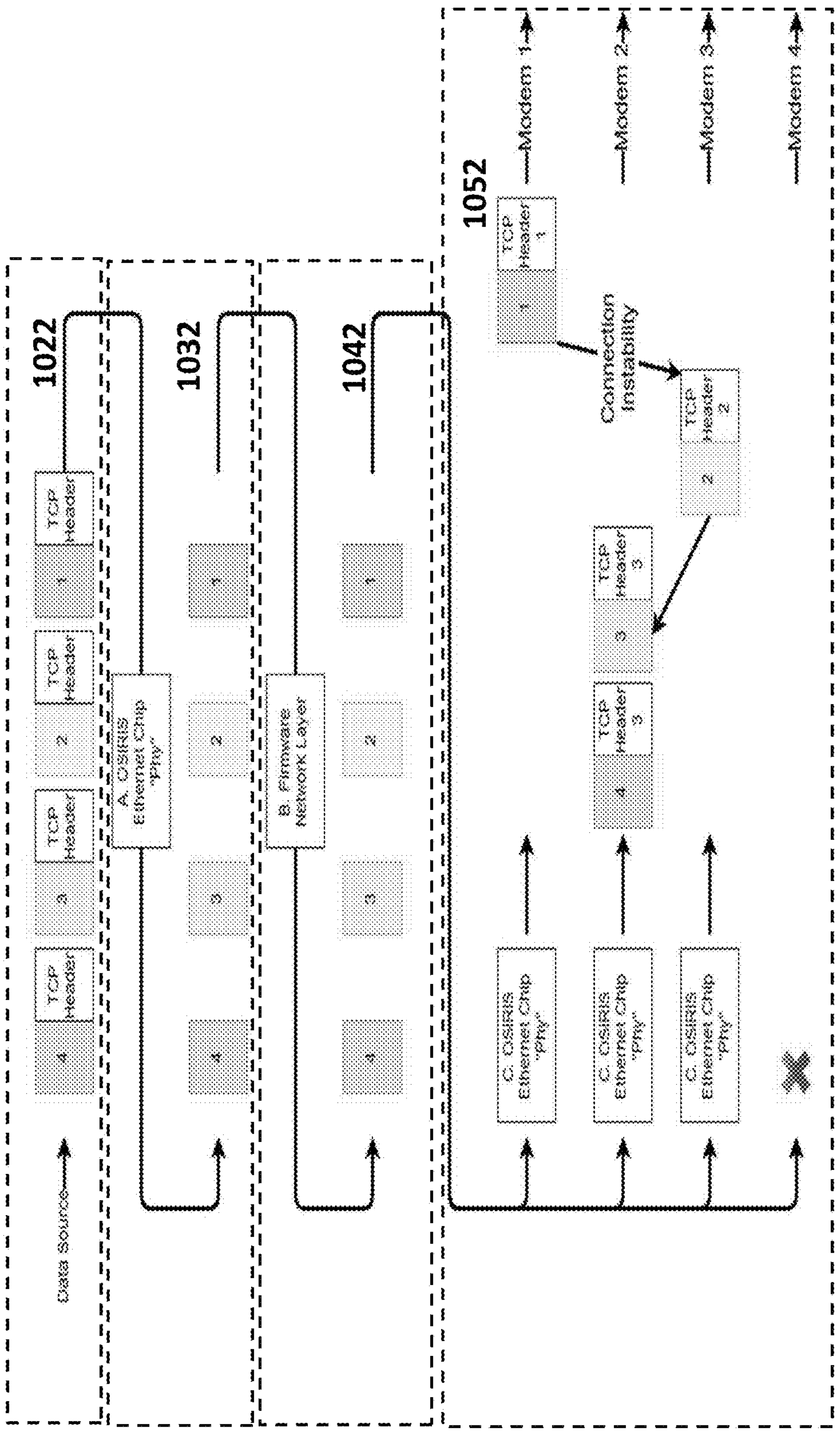
FIG. 10B is an example data flow diagram of the routing decision making according to the example illustrated in FIG. 10A.

FIG. 10A illustrates an example process flow diagram (1000) of a routing decision making process according to some embodiments. The process flow diagram (1000) can be performed by a smart routing system (400) included in a controller (215) of a DSDN node (e.g., a source DSDN node). FIG. 9B is an example data flow diagram of the routing decision making process according to the example illustrated in FIG. 10A. FIG. 10B is merely illustrated as an example without limiting the scope of the process (1000). For example, the quantities and types of data payloads, headers, and routing devices (such as modems) are provided as illustrative examples without limitation. The specific numbers and types of data payloads, headers included in each payload, and routing devices can be determined based on the requirements of particular applications.

At step 1010, a DSDN node (e.g., a source DSDN node) can receive a plurality of external datasets from one or more devices communicatively coupled with the source DSDN node. In some embodiments, the one or more devices are communicatively coupled with the source DSDN node outside of the DSDN. In these embodiments, the controller (215) of the source DSDN node can convert the external dataset format into a common data format used in the DSDN. The detailed description of the dataset format conversion is illustrated in FIGS. 6A-6D. In some embodiments, each external dataset includes at least a transmission control protocol (TCP) header and a data payload, and the TCP header includes at least a time stamp that indicates transmission time of the external dataset to the source DSDN node and destination DSDN node information. In other examples, the TCP header information of each external dataset can include source address, destination address, and other information, such as the time stamp. In some examples, the source DSDN node is an unmanned air vehicle that includes various sensors, and these sensors can be the devices, and the external dataset can be generated from these sensors. The present disclosure does not limit the type of data and devices.

At step 1020, the source DSDN node can combine the obtained external dataset based on the received time sequence of each external dataset. In some embodiments, an application layer of the network system layer implemented in the smart routing system (400) may combine the received data packets. For instance, referring to step 822 of FIG. 8B, four distinct external datasets are received, each of which includes a TCP header and data payload (designated as 1, 2, 3, and 4). Additionally, these external datasets are combined based on their time sequence, arranging them from data 1 to data 4 according to their reception time, with data 1 being received first.

At step 1030, the source DSDN node can identify data payload (e.g., as represented as 1, 2, 3, and 4) of each external dataset. For example, with reference to step 832 of FIG. 8B, the smart routing system (400) of the source DSDN node can identify the data payload of each data by removing the TCP header.

At step 1040, the source DSDN node can determine delay time information for each external dataset. In some embodiments, the delay time information can be determined based on the time stamp included in the TCP header and the received time for each external dataset. For example, the delay time information can be determined by identifying the time difference between the time stamp of the TCP header and the received time at the source DSDN node for each external dataset.

At step 1050, the source DSDN node can add the delay time information to each external data payload (e.g., as represented as 1, 2, 3, and 4) of the external datasets. In some embodiments, the delay time information can be added to the TCP header associated with each data payload. For example, the determined delay time can be added to the TCP header of each data payload, such as TCP header 1, 2, and 3 shown in FIG. 10B (e.g., at step 1052). In some embodiments, the data payloads 3 and 4 can have the same delay time, such that the data payloads can be transmitted simultaneously. In some examples, the data payloads 3 and 4 can have a different delay time, such that the data payloads 3 and 4 can be sent sequentially.

At step 1060, the source DSDN node can select one or more routing devices (e.g., modems) to transmit the data payloads. In some embodiments, a physical layer of the source DSDN node can include a plurality of routing devices, such as modems. In some examples, the source DSDN node can monitor the performance of each modem of the plurality of modems in real time or near real time. The performance can be referred to as the performance status of each modem. For example, the source DSDN node can monitor each modem's utilization rate, available bandwidth, available networking capacity, etc. For example, as illustrated in step 1052 of FIG. 10B, the source DSDN node may select modem 1 based on monitoring results of the performance of modems (e.g., modems 1, 2, 3, and 4).

At step 1070, the source DSDN node can transmit the data payloads (e.g., duplicated data payloads) to a destination DSDN node via the selected modem(s). In some embodiments, the destination DSDN node is determined by processing the TCP header of each obtained data set. In some embodiments, the sequence of the transmission of each data payload can be determined based on delay time information, such as from the shortest delay time to the longest delay time.

At step 1080, the source DSDN node can determine whether the transmission is completed. More specifically, the source DSDN node can determine whether all the data payloads have been transmitted. If all the data payloads have been transmitted, process (1000) can end at step 1100. However, if not all data payloads have been transmitted, process (1000) proceeds to step 1090.

At step 1090, the source DSDN node can determine whether the performance of the selected modem has degraded. More specifically, the source DSDN node can determine whether the performance of the selected modem is decreased to its threshold. The threshold can be determined based on specific applications. In some embodiments, the performance degradation can generally refer to network interruptions, but the present disclosure is not limited to any specific type of network interruption. If the source DSDN node determines that there is performance degradation of the selected modem, process (1000) proceeds to step 1060 to select another modem. For example, as illustrated in step 1052 of FIG. 10B, after the first data payload (e.g., data 1) is transmitted via modem 1, if modem 1's performance degrades due to connection instability, the source DSDN node can reselect modem 3 and continue to transmit the second data payload (e.g., data 2). If the source node determines no performance of modem degradation, the process (1000) proceeds to step 1070.

In some embodiments, a non-transitory computer-readable medium having stored thereon instructions which, when executed by at least one computing device, performs all or a portion of the methods described.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A DSDN node can be or include a microprocessor, but in the alternative, the DSDN node can be or include a smart routing system, micro Smart routing system, or state machine, combinations of the same, or the like configured to generate and analyze indicator feedback. The DSDN node can include electrical circuitry configured to process computer-executable instructions. Although described herein primarily with respect to digital technology, an image processing system may also include primarily analog components. For example, some or all of the image file analysis and rotation notation features described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in specifically tailored hardware, in a specialized software module executed by an image processing system, or in a combination of the two. A software module can reside in random access memory (RAM) memory, flash memory, read-only memory (ROM), erasable programmable read-only memory (EPROM), electrically erasable programmable read-only memory (EEPROM), registers, hard disk, a removable disk, a compact disc read-only memory (CD-ROM), or other forms of a non-transitory computer-readable storage medium. An exemplary storage medium can be coupled to the image processing system such that the image processing system can read information from and write information to the storage medium. In the alternative, the storage medium can be integral to the image processing system. The DSDN node and the storage medium can reside in an application specific integrated circuit (ASIC). The ASIC can reside in an access device or other monitoring device. In the alternative, the DSDN node and the storage medium can reside as discrete components in an access device or other item processing device. In some embodiments, the method may be a computer-implemented method performed under the control of a computing device, such as an access device or other item processing device, executing specific computer-executable instructions.

Conditional language used herein, such as, among others, “can,” “could,” “might,” “may,” “e.g.,” and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms “comprising,” “including,” “having,” and the like are synonymous and are used inclusively, in an open-ended fashion, and do not exclude additional elements, features, acts, operations, and so forth. Also, the term “or” is used in its inclusive sense (and not in its exclusive sense) so that when used, for example, to connect a list of elements, the term “or” means one, some, or all of the elements in the list.

Disjunctive language such as the phrase “at least one of X, Y, Z,” unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some embodiments, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some embodiments, include a signal utilized to transmit one or more representations of the information. While recited in the singular, it will be understood that a message may be composed, transmitted, stored, received, etc. in multiple parts.

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it covers all modifications and alternatives coming within the true scope and spirit of the invention as embodied in the attached claims.

What is claimed is:

1. A distributed software-defined network (DSDN) system for communicating data in a DSDN, including a plurality of DSDN nodes, the system comprising:
- a source DSDN node configured to:
  - receive a plurality of external datasets, each external dataset comprising at least a transmission control protocol (TCP) header and a data payload, from one or more external devices, wherein the TCP header comprises at least a time stamp that indicates a transmission time of the external dataset and destination DSDN node information;
  - combine the received plurality of external datasets in a sequence of a received time of each external dataset;
  - for each external dataset:
    - identify the data payload;
    - determine delay time information from the time stamp included in the TCP header and the received time;
    - add the delay time information to the data payload; and
    - generate a data segment by duplicating the data payload and the added delay time information; and
  - transmit the data segment to a destination DSDN node included in the destination DSDN node information.

2. The system of claim 1, wherein the destination DSDN node information includes additional destination DSDN nodes.

3. The system of claim 2, wherein the source DSDN node is further configured to duplicate the data payload and the added time information corresponds to a number of destination DSDN nodes.

4. The system of claim 1, wherein the delay time information is added to each data payload in a form of a delay tolerant network (DTN) header.

5. The system of claim 1, wherein the source DSDN node is further configured to determine the delay time information by identifying a time difference between the time stamp included in the TCP header and the received time.

6. The system of claim 5, wherein the source DSDN node is further configured to adjust the determined delay time information by adding a network path latency between the source DSDN node and the destination DSDN node.

7. The system of claim 1, wherein the one or more external devices are communicatively coupled with the DSDN source node via a network outside of the DSDN.

8. The system of claim 1, wherein the source DSDN node comprises a satellite, and wherein the destination DSDN node comprises a ground station.

9. The system of claim 1, wherein the data segment is configured to be transmitted to the destination DSDN node via a modem connected to a physical network layer of the DSDN source node.

10. The system of claim 1, wherein the destination DSDN node information includes an address or name associated with the destination DSDN node.

11. The system of claim 1, wherein the source DSDN node is further configured to establish a communication path with the destination DSDN node based on routing information pre-defined in a data layer of the source DSDN node.

12. A method of communicating data in a DSDN, including a plurality of DSDN nodes, the method comprising:
- receiving a plurality of external datasets, each external dataset comprising at least a transmission control protocol (TCP) header and a data payload, from one or more external devices, wherein the TCP header comprises at least a time stamp that indicates a transmission time of the external dataset and destination DSDN node information, the destination DSDN node information comprising one or more destination DSDN nodes;

combining the received plurality of external datasets in a sequence of a received time of each external dataset;

for each external dataset:

identifying the data payload;

determining delay time information from the time stamp included in the TCP header and the received time;

adding the delay time information to the data payload in a form of a delay tolerant network (DTN) header; and generating data segments by duplicating the data payload and the added time information, wherein a number of the data segments and duplication corresponds to a number of the one or more destination DSDN nodes; and transmitting each data segment of the generated data segments to one destination DSDN node of the one or more destination DSDN nodes.

* * * * *